(12) United States Patent
Chono

(10) Patent No.: US 10,536,724 B2
(45) Date of Patent: Jan. 14, 2020

(54) VIDEO ENCODING METHOD, VIDEO DECODING METHOD, VIDEO ENCODING DEVICE, VIDEO DECODING DEVICE, AND PROGRAM

(71) Applicant: NEC CORPORATION, Tokyo (JP)

(72) Inventor: Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/080,721

(22) PCT Filed: Nov. 15, 2017

(86) PCT No.: PCT/JP2017/041085
§ 371 (c)(1),
(2) Date: Aug. 29, 2018

(87) PCT Pub. No.: WO2018/123314
PCT Pub. Date: Jul. 5, 2018

(65) Prior Publication Data
US 2019/0068995 A1 Feb. 28, 2019

(30) Foreign Application Priority Data
Dec. 26, 2016 (JP) .................. 2016-251291

(51) Int. Cl.
*H04N 19/96* (2014.01)
*H04N 19/91* (2014.01)
(Continued)

(52) U.S. Cl.
CPC .......... *H04N 19/91* (2014.11); *H04N 19/184* (2014.11); *H04N 19/70* (2014.11); *H04N 19/96* (2014.11)

(58) Field of Classification Search
CPC .. H04B 7/0619; H04B 7/0671; H04B 7/0691; H04B 7/0874; H04L 1/0625;
(Continued)

(56) References Cited

U.S. PATENT DOCUMENTS

2009/0016161 A1* 1/2009 Gendron ................ G01S 7/539
367/88
2013/0077684 A1 3/2013 Chen et al.
(Continued)

FOREIGN PATENT DOCUMENTS

JP 2012-135017 A 7/2012
WO 2016/203881 A1 12/2016

OTHER PUBLICATIONS

Benjamin Bross et al., "High Efficiency Video Coding (HEVC) text specification draft 10 (for FDIS & Last Call)", Joint Collaborative Team on Video Coding (JCT-VC) of ITU-T SG16 WP3 and ISO/IEC JTC1/SC29/WG11 12th Meeting, Jan. 14-23, 2013.
(Continued)

*Primary Examiner* — Sath V Perungavoor
*Assistant Examiner* — Yong Joon Kwon
(74) *Attorney, Agent, or Firm* — Sughrue Mion, PLLC

(57) ABSTRACT

An entropy encoding control unit 13, in the case where the skip flag of a block of an end node in a quadtree structure indicates that the binary tree split flag succeeds, causes the entropy encoding unit 11 to entropy-encode the binary tree split flag and the binary tree split direction flag, and in the case where the skip flag of the block of the end node in the quadtree structure indicates that the binary tree split flag does not succeed, causes the entropy encoding unit 11 not to entropy-encode the binary tree split flag and the binary tree split direction flag, and in the case where a node of a size equal to the minimum size is further partitioned based on the binary tree structure, causes the entropy encoding unit 11 not to entropy-encode the binary tree split direction flag at the node.

15 Claims, 18 Drawing Sheets

(51) Int. Cl.
H04N 19/70 (2014.01)
H04N 19/184 (2014.01)

(58) Field of Classification Search
CPC ... H04L 1/0631; H04L 5/0023; H04L 5/0062; H04N 19/119; H04N 19/13; H04N 19/157; H04N 19/176; H04N 19/70; H04N 19/91; H04N 19/96
See application file for complete search history.

(56) References Cited

U.S. PATENT DOCUMENTS

| | | | |
|---|---|---|---|
| 2017/0272759 A1* | 9/2017 | Seregin | H04N 19/11 |
| 2017/0272782 A1* | 9/2017 | Li | H04N 19/96 |
| 2018/0139444 A1* | 5/2018 | Huang | H04N 19/119 |
| 2018/0242024 A1* | 8/2018 | Chen | H04N 19/52 |
| 2018/0332288 A1* | 11/2018 | Hsiang | H04N 19/96 |

OTHER PUBLICATIONS

Jicheng An et al., "Quadtree plus binary tree structure integration with JEM tools", JVET-B0023, Joint Video Exploration Team (JVET) of ITU-T SG 16 WP 3 and ISO/IEC JTC 1/SC 29/WG 11 2nd Meeting, Feb. 20-26, 2016.

Jianle Chen et al., "Algorithm Description of Joint Exploration Test Model 4", Joint Video Exploration Team (JVET) of ITU-T SG 16 WP 3 and ISO/IEC JTC 1/SC 29/WG 11 4th Meeting, Oct. 15-21, 2016, pp. 1-3.

Han Huang et al., "EE2.1: Quadtree plus binary tree structure integration with JEM tools", Joint Video Exploration Team (JVET) of ITU-T SG 16 WP 3 and ISO/IEC JTC 1/SC 29/WG 11 3rd Meeting, May 26-Jun. 1, 2016.

International Search Report for PCT/JP2017/041085 dated Jan. 16, 2018.

* cited by examiner

FIG. 17
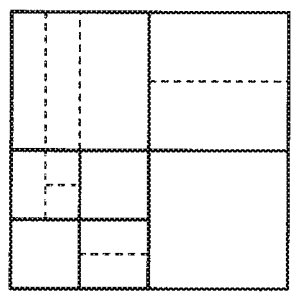 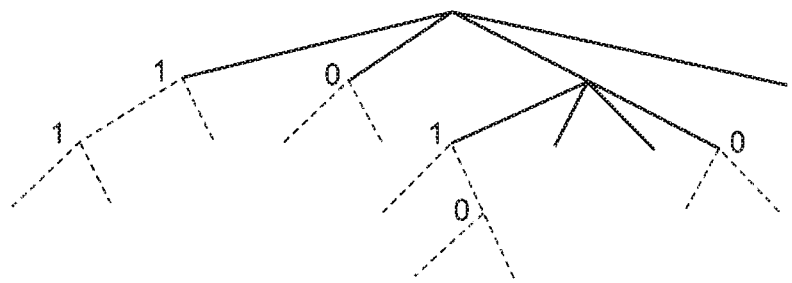
(a)                 (b)

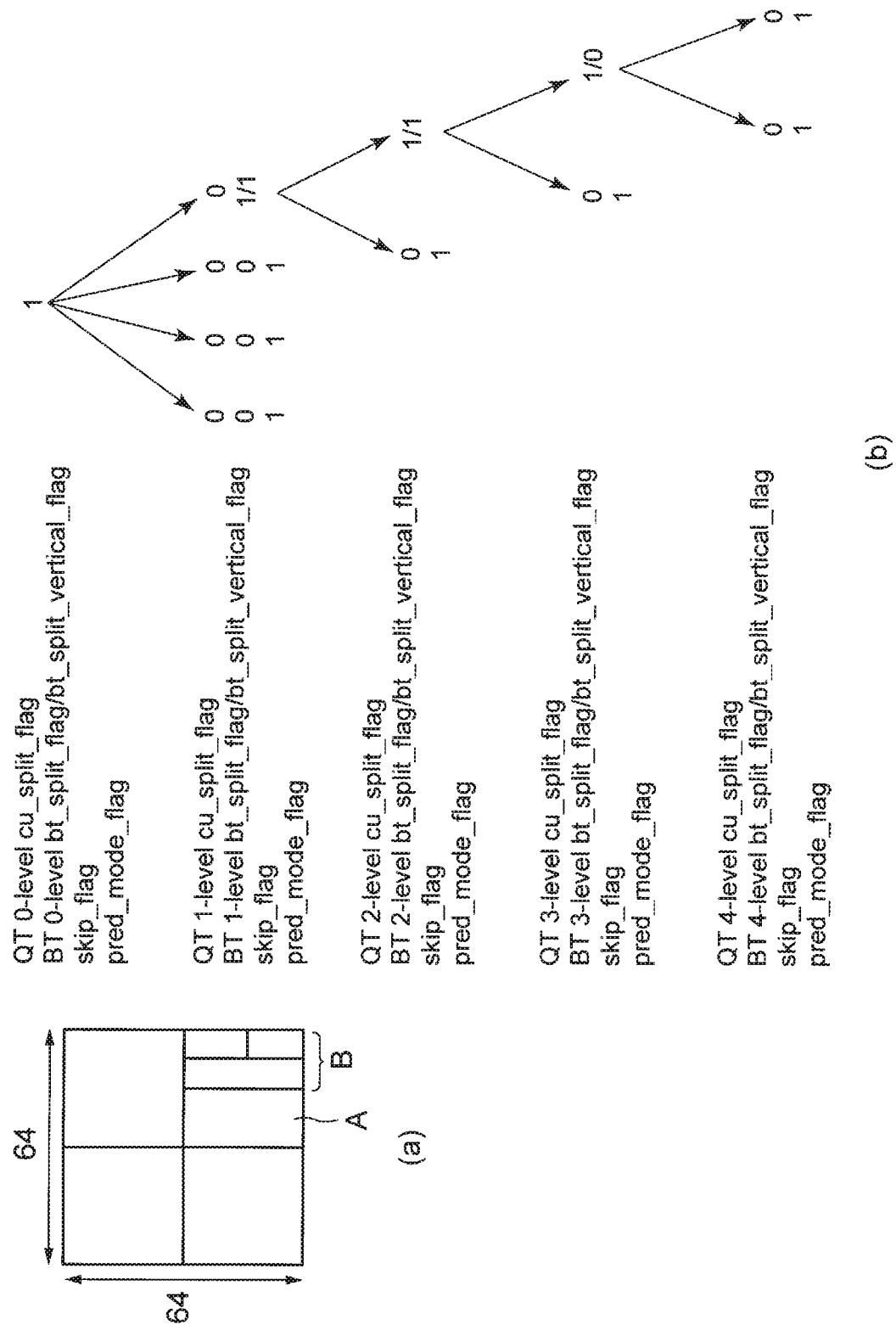

VIDEO ENCODING METHOD, VIDEO DECODING METHOD, VIDEO ENCODING DEVICE, VIDEO DECODING DEVICE, AND PROGRAM

CROSS REFERENCE TO RELATED APPLICATIONS

This application is a National Stage of International Application No. PCT/JP2017/041085 filed Nov. 15, 2017, claiming priority based on Japanese Patent Application No. 2016-251291 filed Dec. 26, 2016, the disclosure of which is incorporated herein in its entirety.

TECHNICAL FIELD

The present invention relates to a video coding technique using a block partitioning structure based on a quadtree and a binary tree.

BACKGROUND ART

In a video coding system described in Non Patent Literature 1, each frame of digitized video is split into coding tree units (CTUs), and each CTU is encoded in raster scan order.

Each CTU is split into coding units (CUs) and encoded, in a quadtree structure. Each CU is split into prediction units (PUs) and prediction-encoded. Prediction encoding includes intra prediction and inter-frame prediction.

A prediction error of each CU is split into transform units (TUs) and transform-encoded based on frequency transform, in a quadtree structure.

A CU of the largest size is referred to as a largest CU (largest coding unit: LCU), and a CU of the smallest size is referred to as a smallest CU (smallest coding unit: SCU). The LCU size and the CTU size are the same.

The following describes intra prediction and inter-frame prediction, and signaling of CTU, CU, PU, and TU.

Intra prediction is prediction for generating a prediction image from a reconstructed image having the same display time as a frame to be encoded. Non Patent Literature 1 defines 33 types of angular intra prediction depicted in FIG. 9. In angular intra prediction, a reconstructed pixel near a block to be encoded is used for extrapolation in any of 33 directions, to generate an intra prediction signal. In addition to 33 types of angular intra prediction, Non Patent Literature 1 defines DC intra prediction for averaging reconstructed pixels near the block to be encoded, and planar intra prediction for linear interpolating reconstructed pixels near the block to be encoded. A CU encoded based on intra prediction is hereafter referred to as intra CU.

Inter-frame prediction is prediction for generating a prediction image from a reconstructed image (reference picture) different in display time from a frame to be encoded. Inter-frame prediction is hereafter also referred to as inter prediction. FIG. 10 is an explanatory diagram depicting an example of inter-frame prediction. A motion vector MV= $(mv_x, mv_y)$ indicates the amount of translation of a reconstructed image block of a reference picture relative to a block to be encoded. In inter prediction, an inter prediction signal is generated based on a reconstructed image block of a reference picture (using pixel interpolation if necessary). A CU encoded based on inter-frame prediction is hereafter referred to as "inter CU".

A frame encoded including only intra CUs is called "I frame" (or "I picture"). A frame encoded including not only intra CUs but also inter CUs is called "P frame" (or "P picture"). A frame encoded including inter CUs that each use not only one reference picture but two reference pictures simultaneously for the inter prediction of the block is called "B frame" (or "B picture").

Skip mode indicates that a CU to be processed is prediction-encoded by frame prediction based on 2N×2N shape of the below-mentioned PU partitioning shape and the below-mentioned transform quantization value is not present. Whether or not each CU is skip mode is signaled by skip_flag syntax described in Non Patent Literature 1.

Whether each CU that is not skip mode is an intra CU or an inter CU is signaled by pred_mode_flag syntax described in Non Patent Literature 1.

FIG. 11 is an explanatory diagram depicting an example of CTU partitioning of a frame t and an example of CU partitioning of the eighth CTU (CTU8) included in the frame t, in the case where the spatial resolution of the frame is the common intermediate format (CIF) and the CTU size is 64.

FIG. 12 is an explanatory diagram depicting a quadtree structure corresponding to the example of CU partitioning of CTU8. The quadtree structure, i.e. the CU partitioning shape, of each CTU is signaled by cu_split_flag syntax described in Non Patent Literature 1.

FIG. 13 is an explanatory diagram depicting PU partitioning shapes of a CU. In the case where the CU is an intra CU, square PU partitioning is selectable. In the case where the CU is an inter CU, not only square but also rectangular PU partitioning is selectable. The PU partitioning shape of each CU is signaled by part_mode syntax described in Non Patent Literature 1.

FIG. 14 is an explanatory diagram depicting examples of TU partitioning of a CU. An example of TU partitioning of an intra CU having a 2N×2N PU partitioning shape is depicted in the upper part of the drawing. In the case where the CU is an intra CU, the root of the quadtree is located in the PU, and the prediction error of each PU is expressed by the quadtree structure. An example of TU partitioning of an inter CU having a 2N×N PU partitioning shape is depicted in the lower part of the drawing. In the case where the CU is an inter CU, the root of the quadtree is located in the CU, and the prediction error of the CU is expressed by the quadtree structure. The quadtree structure of the prediction error, i.e. the TU partitioning shape of each CU, is signaled by split_tu_flag syntax described in Non Patent Literature 1.

This completes the description of intra prediction and inter-frame prediction, and signaling of CTU, CU, PU, and TU.

The following describes the structure and operation of a typical video encoding device that receives each CU of each frame of digitized video as an input image and outputs a bitstream, with reference to a block diagram in FIG. 15.

A video encoding device depicted in FIG. 15 includes a transformer/quantizer 101, an entropy encoder 102, an inverse quantizer/inverse transformer 103, a buffer 104, a predictor 105, and a multiplexer 106.

The predictor 105 determines, for each CTU, a cu_split_flag syntax value for determining a CU partitioning shape that minimizes the coding cost.

The predictor 105 then determines, for each CU, a pred_mode_flag syntax value for determining intra prediction/inter prediction, a part_mode syntax value for determining a PU partitioning shape, a split_tu_flag syntax value for determining a TU partitioning shape, an intra prediction direction, and a motion vector that minimize the coding cost.

The predictor 105 further determines a skip_flag syntax value for determining skip mode.

In detail, in the case where, for the CU to be processed, the determined pred_mode_flag indicates inter prediction, the determined part_mode indicates 2N×2N, and the below-mentioned transform quantization value is not present, the predictor 105 sets skip_flag to 1 (i.e. skip mode is set). Otherwise, the predictor 105 sets skip_flag to 0 (i.e. skip mode is not set).

The predictor 105 generates a prediction signal corresponding to the input image signal of each CU, based on the determined cu_split_flag syntax value, pred_mode_flag syntax value, part_mode syntax value, split_tu_flag syntax value, intra prediction direction, motion vector, etc. The prediction signal is generated based on the above-mentioned intra prediction or inter-frame prediction.

The transformer/quantizer 101 frequency-transforms a prediction error image obtained by subtracting the prediction signal from the input image signal, based on the TU partitioning shape determined by the predictor 105.

The transformer/quantizer 101 further quantizes the frequency-transformed prediction error image (frequency transform coefficient). The quantized frequency transform coefficient is hereafter referred to as "transform quantization value".

The entropy encoder 102 entropy-encodes the cu_split_flag syntax value, the skip_flag syntax value, the pred_mode_flag syntax value, the part_mode syntax value, the split_tu_flag syntax value, the difference information of the intra prediction direction, and the difference information of the motion vector determined by the predictor 105 (these prediction-related information are hereafter also referred to as "prediction parameters"), and the transform quantization value.

The inverse quantizer/inverse transformer 103 inverse-quantizes the transform quantization value. The inverse quantizer/inverse transformer 103 further inverse-frequency-transforms the frequency transform coefficient obtained by the inverse quantization.

The prediction signal is added to the reconstructed prediction error image obtained by the inverse frequency transform, and the result is supplied to the buffer 104. The buffer 104 stores the reconstructed image.

The multiplexer 106 multiplexes and outputs the entropy-encoded data supplied from the entropy encoder 102, as a bitstream.

The typical video encoding device generates a bitstream by the operation described above.

The following describes the structure and operation of a typical video decoding device that receives a bitstream as input and outputs a decoded video frame, with reference to FIG. 16.

A video decoding device depicted in FIG. 16 includes a de-multiplexer 201, an entropy decoder 202, an inverse quantizer/inverse transformer 203, a predictor 204, and a buffer 205.

The de-multiplexer 201 de-multiplexes an input bitstream to extract an entropy-encoded video bitstream.

The entropy decoder 202 entropy-decodes the video bitstream. The entropy decoder 202 entropy-decodes the prediction parameters and the transform quantization value, and supplies them to the inverse quantizer/inverse transformer 203 and the predictor 204.

The inverse quantizer/inverse transformer 203 inverse-quantizes the transform quantization value. The inverse quantizer/inverse transformer 203 further inverse-frequency-transforms the frequency transform coefficient obtained by the inverse quantization.

After the inverse frequency transform, the predictor 204 generates a prediction signal using a reconstructed image stored in the buffer 205, based on the entropy-decoded prediction parameters.

After the prediction signal is generated, the prediction signal supplied from the predictor 204 is added to the reconstructed prediction error image obtained by the inverse frequency transform by the inverse quantizer/inverse transformer 203, and the result is supplied to the buffer 205 as a reconstructed image.

The reconstructed image stored in the buffer 205 is then output as a decoded image (decoded video).

The typical video decoding device generates a decoded image by the operation described above.

Non Patent Literature 2 discloses a video coding technique using a block partitioning structure based on a quadtree and a binary tree (BT), which is called QuadTree plus Binary Tree (QTBT) and is an extension to the above-mentioned system described in Non Patent Literature 1.

In a QTBT structure, a coding tree unit (CTU) is recursively split into square coding units (CUs) based on a quadtree structure. Each recursively split CU is further recursively split into rectangular or square blocks based on a binary tree structure, for a prediction process or a transform process. In the QTBT structure, part_mode syntax is not used.

FIG. 17 is an explanatory diagram depicting the QTBT structure described in Non Patent Literature 2. An example of block partitioning of a CTU is shown in (a) of FIG. 17, and its tree structure is shown in (b) of FIG. 17. In FIG. 17, each solid line indicates partitioning based on the quadtree structure, and each dashed line indicates partitioning based on the binary tree structure. In partitioning based on the binary tree structure, rectangular blocks are allowed, so that information indicating the splitting direction (the direction in which the splitting line extends) is necessary. In (b) of FIG. 17, 0 indicates splitting in the horizontal direction, and 1 indicates splitting in the vertical direction. The QTBT structure can express rectangular partitioning shapes more flexibly, and thus enhance the compression efficiency of the video system based on the block partitioning structure described in Non Patent Literature 1.

CITATION LIST

Non Patent Literatures

NPL 1: High Efficiency Video Coding (HEVC) text specification draft 10 (for FDIS & Last Call) of ITU-T SG16 WP3 and ISO/IEC JTC1/SC29/WG11 12th Meeting: Geneva, CH, 14-23 Jan. 2013

NPL 2: Jicheng An, et al., "Quadtree plus binary tree structure integration with JEM tools", JVET-B0023, Joint Video Exploration Team (JVET) of ITU-T SG 16 WP 3 and ISO/IEC JTC 1/SC 29/WG 11 2nd Meeting: San Diego, USA, 20-26 Feb. 2016

SUMMARY OF INVENTION

Technical Problem

FIG. 18 is an explanatory diagram depicting an example of block partitioning of a CTU based on the QTBT structure and its tree structure.

The definitions of cu_split_flag, bt_split_flag, bt_split_vertical_flag, and skip_flag used in FIG. 18 are described first.

cu_split_flag indicates whether or not partitioning based on the quadtree structure is performed. When cu_split_flag is 0, partitioning based on the quadtree structure is not performed (i.e. the block is a block of an end node in a quadtree structure). When cu_split_flag is 1, partitioning based on the quadtree structure is performed.

bt_split_flag indicates whether or not partitioning based on the binary tree structure is performed. When bt_split_flag is 0, partitioning based on the binary tree structure is not performed (i.e. the block is a block of an end node in a binary tree structure). When bt_split_flag is 1, partitioning based on the binary tree structure is performed.

bt_split_vertical_flag is present when bt_split_flag is 1. bt_split_vertical_flag indicates the splitting direction. When bt_split_vertical_flag is 0, splitting is performed in the horizontal direction. When bt_split_vertical_flag is 1, splitting is performed in the vertical direction.

skip_flag=0 indicates that succeeding encoded data is present, and skip_flag=1 indicates that succeeding encoded data is not present.

An example of block partitioning is shown in (a) of FIG. 18. In (b) of FIG. 18, the syntax elements and QTBT structure, which corresponds to the partitioning is shown in (a) of FIG. 18, is shown.

In the example depicted in (a) of FIG. 18, a 64×64 (64 pixels×64 pixels) block is split into four 32×32 blocks based on the quadtree structure. Accordingly, at QT 0-level (depth 0), the cu_split_flag value indicates partitioning (1 in this example).

At QT 1-level (depth 1), the lower right 32×32 block is split into two in the vertical direction. For the 32×32 block, the cu_split_flag value indicates non-partitioning (0 in this example), but the bt_split_flag value at BT 1-level (depth 1) indicates partitioning (1 in this example). Moreover, the bt_split_vertical_flag value indicates the vertical direction (1 in this example). For the other three 32×32 blocks, the bt_split_flag value relating to the binary tree structure indicates non-partitioning (0 in this example). Further, the skip_flag value is 1.

At BT 2-level (depth 2), for the left 16×32 block A included in the lower right 32×32 block, the bt_split_flag value indicates non-partitioning (0 in this example), as the block is subjected to no more partitioning. The skip_flag value is 1.

For the right 16×32 block B, the bt_split_flag value indicates partitioning (1 in this example), as the block is subjected to further partitioning. The bt_split_vertical_flag value indicates the vertical direction (1 in this example).

At BT 3-level (depth 3), the left 8×32 block included in the lower right 16×32 block B is not subjected to partitioning, so that the bt_split_flag value indicates non-partitioning (0 in this example). The skip_flag value is 1.

The right 8×32 block is subjected to partitioning, so that the bt_split_flag value indicates partitioning (1 in this example). The bt_split_vertical_flag value indicates the horizontal direction (0 in this example).

At BT 4-level (depth 4), the upper 8×16 block and the lower 8×16 block included in the lower right 8×32 block are both not subjected to partitioning. Accordingly, for each of the blocks, the bt_split_flag value indicates non-partitioning (0 in this example). The skip_flag value is 1.

When using the above-mentioned QTBT structure, block partitioning/non-partitioning information based on the binary tree structure (hereafter referred to as "binary tree split flag") and horizontal/vertical splitting direction information (hereafter referred to as "binary tree split direction flag") need to be transmitted in addition to block partitioning/non-partitioning information based on the quadtree structure (hereafter referred to as "quadtree split flag").

Since the binary tree split flag and the binary tree split direction flag are transmitted for each block, the number of bits increases significantly especially under a low bitrate condition.

Thus, these flag information incurs overhead code amount and causes a decrease in compression efficiency, and also causes an increase in entropy encoding/decoding processing quantity.

In the case of using the QTBT structure, the minimum block size can be set. The minimum size is a concept including both the minimum width and the minimum height. Suppose the minimum size is set to "N". If the width (the number of pixels in the horizontal direction) of the block reaches N, the block cannot be further split in the vertical direction. This is because such splitting results in a width of N/2. If the height ((the number of pixels in the vertical direction) of the block reaches N, the block cannot be further split in the horizontal direction. This is because such splitting results in a height of N/2.

Thus, in the case of splitting a block whose width or height is the minimum size based on binary tree partitioning, the splitting direction is uniquely determined. In the system depicted in (b) of FIG. 18, however, unnecessary (i.e. redundant) bt_split_vertical_flag is transmitted even in such a case.

The present invention has an object of improving compression performance and reducing the entropy encoding processing quantity and entropy decoding processing quantity in a video encoding process and video decoding process that use a block partitioning structure based on a quadtree and a binary tree.

Solution to Problem

A video encoding method according to the present invention is a video encoding method including an entropy encoding step of entropy-encoding a quadtree split flag, a skip flag, a binary tree split flag, and a binary tree split direction flag, the video encoding method comprising: a step of multiplexing information indicating a minimum size of partitioning based on a binary tree structure, in a bitstream; and an entropy encoding control step of, in the case where the skip flag of a block of an end node in a quadtree structure indicates that the binary tree split flag succeeds, causing the entropy encoding step to entropy-encode the binary tree split flag and the binary tree split direction flag, and in the case where the skip flag of the block of the end node of the quadtree structure indicates that the binary tree split flag does not succeed, causing the entropy encoding step not to entropy-encode the binary tree split flag and the binary tree split direction flag, wherein in the case where a node of a size equal to the minimum size is further partitioned based on the binary tree structure, the entropy encoding control step causes the entropy encoding step not to entropy-encode the binary tree split direction flag at the node.

A video decoding method according to the present invention is a video decoding method including an entropy decoding step of entropy-decoding a quadtree split flag, a skip flag, a binary tree split flag, and a binary tree split direction flag, the video decoding method comprising: a step of extracting information indicating a minimum size of partitioning based on a binary tree structure, from a bitstream; and an entropy decoding control step of, in the case where the skip flag of a block of an end node in a quadtree structure indicates that the binary tree split flag succeeds, causing the entropy decoding step to entropy-decode the binary tree split flag and the binary tree split direction flag, and in the case where the skip flag of the block of the end node in the quadtree structure indicates that the binary tree split flag does not succeed, causing the entropy decoding step not to entropy-decode the binary tree split flag and the binary tree split direction flag, wherein in the case where a node of a size equal to the minimum size is further partitioned based on the binary tree structure, the entropy decoding control step causes the entropy decoding step not to entropy-decode the binary tree split direction flag at the node.

A video encoding device according to the present invention comprises: entropy encoding means for entropy-encoding at least a quadtree split flag, a skip flag, a binary tree split flag, and a binary tree split direction flag; size multiplexing means for multiplexing information indicating a minimum size of partitioning based on a binary tree structure, in a bitstream; and entropy encoding control means for controlling the entropy encoding means, wherein the entropy encoding control means, in the case where the skip flag of a block of an end node in a quadtree structure indicates that the binary tree split flag succeeds, causes the entropy encoding means to entropy-encode the binary tree split flag and the binary tree split direction flag, and in the case where the skip flag of the block of the end node in the quadtree structure indicates that the binary tree split flag does not succeed, causes the entropy encoding means not to entropy-encode the binary tree split flag and the binary tree split direction flag, and wherein in the case where a node of a size equal to the minimum size is further partitioned based on the binary tree structure, the entropy encoding control means causes the entropy encoding means not to entropy-encode the binary tree split direction flag at the node.

A video decoding device according to the present invention comprises: entropy decoding means for entropy-decoding at least a quadtree split flag, a skip flag, a binary tree split flag, and a binary tree split direction flag; size extraction means for extracting information indicating a minimum size of partitioning based on a binary tree structure, from a bitstream; and entropy decoding control means for controlling the entropy decoding means, wherein the entropy decoding control means, in the case where the skip flag of a block of an end node in a quadtree structure indicates that the binary tree split flag succeeds, causes the entropy decoding means to entropy-decode the binary tree split flag and the binary tree split direction flag, and in the case where the skip flag of the block of the end node in the quadtree structure indicates that the binary tree split flag does not succeed, causes the entropy decoding means not to entropy-decode the binary tree split flag and the binary tree split direction flag, and wherein in the case where a node of a size equal to the minimum size is further partitioned based on the binary tree structure, the entropy decoding control means causes the entropy decoding means not to entropy-decode the binary tree split direction flag at the node.

A video encoding program according to the present invention is a video encoding program for causing a computer to execute a process including an entropy encoding process of entropy-encoding a quadtree split flag, a skip flag, a binary tree split flag, and a binary tree split direction flag, the video encoding program further causing the computer to execute: a process of multiplexing information indicating a minimum size of partitioning based on a binary tree structure, in a bitstream; and an entropy encoding control process of, in the case where the skip flag of a block of an end node in a quadtree structure indicates that the binary tree split flag succeeds, causing the entropy encoding process to entropy-encode the binary tree split flag and the binary tree split direction flag, and in the case where the skip flag of the block of the end node in the quadtree structure indicates that the binary tree split flag does not succeed, causing the entropy encoding process not to entropy-encode the binary tree split flag and the binary tree split direction flag, wherein in the entropy encoding control process, in the case where a node of a size equal to the minimum size is further partitioned based on the binary tree structure, the video encoding program further causing the entropy encoding process not to entropy-encode the binary tree split direction flag at the node.

A video decoding program according to the present invention is a video decoding program for causing a computer to execute a process including an entropy decoding process of entropy-decoding a quadtree split flag, a skip flag, a binary tree split flag, and a binary tree split direction flag, the video decoding program further causing the computer to execute: a process of extracting information indicating a minimum size of partitioning based on a binary tree structure, from a bitstream; and an entropy decoding control process of, in the case where the skip flag of a block of an end node in a quadtree structure indicates that the binary tree split flag succeeds, causing the entropy decoding process to entropy-decode the binary tree split flag and the binary tree split direction flag, and in the case where the skip flag of the block of the end node in the quadtree structure indicates that the binary tree split flag does not succeed, causing the entropy decoding process not to entropy-decode the binary tree split flag and the binary tree split direction flag, wherein in the entropy decoding control process, in the case where a node of a size equal to the minimum size is further partitioned based on the binary tree structure, the video decoding program further causing the entropy decoding process not to entropy-decode the binary tree split direction flag at the node.

Advantageous Effects of Invention

According to the present invention, compression performance is improved, and the entropy encoding processing quantity and entropy decoding processing quantity are reduced.

BRIEF DESCRIPTION OF DRAWINGS

FIG. 17 is an explanatory diagram depicting an example of block partitioning of a CTU described in Non Patent Literature 2 and its tree structure.

FIG. 18 is an explanatory diagram depicting an example of block partitioning of a CTU based on a QTBT structure and its tree structure.

DESCRIPTION OF EMBODIMENT

Exemplary Embodiment 1

Figure 1:
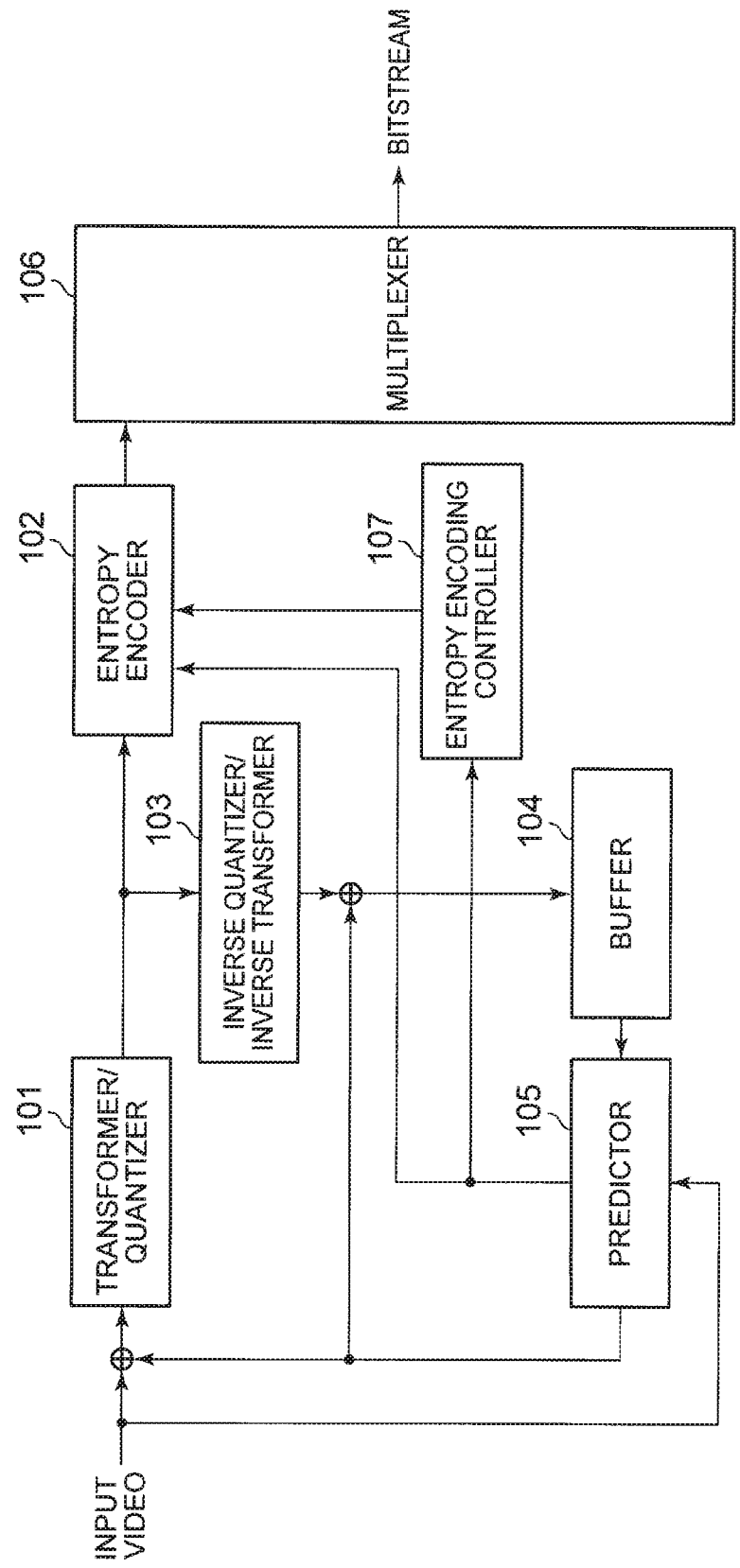
FIG. 1 is a block diagram depicting a video encoding device according to Exemplary Embodiment 1.

FIG. 1 is a block diagram depicting an exemplary embodiment (Exemplary Embodiment 1) of a video encoding device. The video encoding device depicted in FIG. 1 includes a transformer/quantizer 101, an entropy encoder 102, an inverse quantizer/inverse transformer 103, a buffer 104, a predictor 105, a multiplexer 106, and an entropy encoding controller 107.

The definitions of cu_split_flag, btskip_flag, bt_split_flag, bt_split_vertical_flag, and skip_flag in this exemplary embodiment are described below. The definitions of cu_split_flag, bt_split_flag, bt_split_vertical_flag, and skip_flag are as described above.

In this exemplary embodiment, bt_skip_flag is used. bt_skip_flag is present in a block of an end node in a quadtree structure. bt_skip_flag indicates whether or not succeeding encoded data is present. In this exemplary embodiment, when bt_skip_flag is present, bt_skip_flag=0 indicates that succeeding encoded data (bt_split_flag) is present, and btskip_flag=1 indicates that succeeding encoded data (bt_split_flag) is not present. The video decoding side implicitly interprets btskip_flag as 0, in the case where bt_skip_flag is not present. In this exemplary embodiment, bt_split_vertical_flag may not be present even when bt_split_flag is 1.

skip_flag=0 indicates that succeeding encoded data is present, and skip_flag=1 indicates that succeeding encoded data is not present. The video decoding side implicitly interprets skip_flag as being equal to bt_skip_flag, in the case where skip_flag is not present in the bitstream.

A block generated as a result of partitioning based on a quadtree structure or a binary tree structure is hereafter also referred to as "subblock".

The predictor 105 determines, for each CTU, cu_split_flag, bt_split_flag, and bt_split_vertical_flag that minimize the coding cost. Incidentally, cu_split_flag, bt_split_flag, and bt_split_vertical_flag determine a QTBT partitioning shape.

The predictor 105 then determines pred_mode_flag for determining intra prediction/inter prediction, split_tu_flag for determining a TU partitioning shape, an intra prediction direction, and a motion vector, for each subblock generated by QTBT partitioning based on the determined cu_split_flag, bt_split_flag, and bt_split_vertical_flag. The pred_mode_flag, split_tu_flag, intra prediction direction and motion vector to be determined minimize the coding cost.

The predictor 105 then determines skip_flag for determining skip mode. In detail, in the case where, for the subblock to be processed, the determined pred_mode_flag indicates inter prediction and a transform quantization value is not present, the predictor 105 sets skip_flag to 1 (i.e. skip mode is set). Otherwise, the predictor 105 sets skip_flag to 0 (i.e. skip mode is not set).

The predictor 105 further determines bt_skip_flag for determining binary tree skip mode. In detail, in the case where, for each subblock, the subblock is a block of an end node in a quadtree structure (i.e. cu_split_flag is 0), is a block of an end node in a binary tree structure (i.e. bt_split_flag is 0), and is skip mode (i.e. skip_flag is 1), the predictor 105 sets btskip_flag to 1 (i.e. binary tree skip mode is set). Otherwise, the predictor 105 sets bt_skip_flag to 0 (i.e. binary tree skip mode is not set).

The predictor 105 generates a prediction signal corresponding to the input image signal of each subblock, based on the determined cu_split_flag syntax value, bt_skip_flag syntax value, bt_split_flag syntax value, bt_split_vertical_flag syntax value, skip_flag syntax value, pred_mode_flag syntax value, split_tu_flag syntax value, intra prediction direction, and motion vector. The prediction signal is generated based on the above-mentioned intra prediction or inter-frame prediction.

The transformer/quantizer 101 frequency-transforms a prediction error image obtained by subtracting the prediction signal from the input image signal, based on the TU partitioning shape determined by the predictor 105. The transformer/quantizer 101 further quantizes the frequency-transformed prediction error image (frequency transform coefficient), to generate a transform quantization value.

The entropy encoding controller 107 monitors cu_split_flag, btskip_flag, bt_split_flag, bt_split_vertical_flag, and skip_flag supplied from the predictor 105 to the entropy encoder 102 for each subblock to be processed, and sets the respective entropy encoding control ("encoding ON" or "encoding OFF") as follows.

When cu_split_flag of the subblock to be processed is 0, the entropy encoding controller 107 sets "encoding ON" for entropy encoding control of btskip_flag. Otherwise, the entropy encoding controller 107 sets "encoding OFF".

When "encoding ON" is set for entropy encoding control of btskip_flag of the subblock to be processed and bt_skip_flag is 0, the entropy encoding controller 107 sets "encoding ON" for entropy encoding control of bt_split_flag. Otherwise, the entropy encoding controller 107 sets "encoding OFF".

When "encoding ON" is set for entropy encoding control of bt_split_flag of the subblock to be processed and bt_split_flag is 1, the entropy encoding controller 107 sets "encoding ON" for entropy encoding control of bt_split_vertical_ flag. Otherwise, the entropy encoding controller 107 sets "encoding OFF".

Here, even in the case where bt_split_flag of the subblock to be processed is 1, the entropy encoding controller 107 sets "encoding OFF" for entropy encoding control of bt_split_vertical_flag if the width or height of the subblock to be processed is equal to the minimum size.

That is, the entropy encoding controller 107 monitors the size of each subblock based on the binary tree structure supplied from the predictor 105 to the entropy encoder 102, and performs entropy encoding control ("encoding ON" or "encoding OFF") of bt_split_vertical_flag.

In detail, in the case where the width or height of the subblock to be processed is equal to the minimum size, when further partitioning the block, the entropy encoding controller 107 causes the entropy encoder 102 to skip the entropy encoding process of bt_split_vertical_flag (sets "encoding OFF" as mentioned above). The minimum size is hereafter denoted by minBTsize. The minimum size may be set to any size. In this exemplary embodiment, the minimum size is "8" as an example. The width and height of the subblock to be processed are respectively denoted by curPartW and curPartH.

When "encoding OFF" is set for entropy encoding control of bt_skip_flag of the subblock to be processed and bt_split_flag is 0, the entropy encoding controller 107 sets "encoding ON" for entropy encoding control of skip_flag. Otherwise, the entropy encoding controller 107 sets "encoding OFF".

The entropy encoder 102 entropy-encodes the cu_split_flag syntax value, the btskip_flag syntax value, the bt_split_flag syntax value, the bt_split_vertical_flag syntax value, the skip_flag syntax value, the pred_mode_flag syntax value, the split_tu_flag syntax value, the difference information of the intra prediction direction, the difference information of the motion vector which are determined by the predictor 105, and the transform quantization value.

Here, when "encoding OFF" is set for entropy encoding control of any of bt_skip_flag, bt_split_flag, bt_split_vertical_flag, and skip_flag, the entropy encoder 102 skips entropy-encoding it.

By the above-mentioned control, bt_skip_flag is signaled only for a block of an end node in a quadtree structure. Thus, redundant signaling of bt_split_flag, bt_split_vertical_flag, and skip_flag are prevented when bt_skip_flag is 1.

Moreover, by the above-mentioned control, redundant signaling of bt_split_vertical_flag is prevented.

The inverse quantizer/inverse transformer 103 inverse-quantizes the transform quantization value. The inverse quantizer/inverse transformer 103 further inverse-frequency-transforms the frequency transform coefficient obtained by the inverse quantization. The prediction signal is added to the reconstructed prediction error image obtained by the inverse frequency transform, and the result is supplied to the buffer 104. The buffer 104 stores the reconstructed image.

The multiplexer 106 multiplexes and outputs the entropy-encoded data supplied from the entropy encoder 102, as a bitstream.

The video encoding device according to this exemplary embodiment generates a bitstream by the operation described above.

Figure 2:
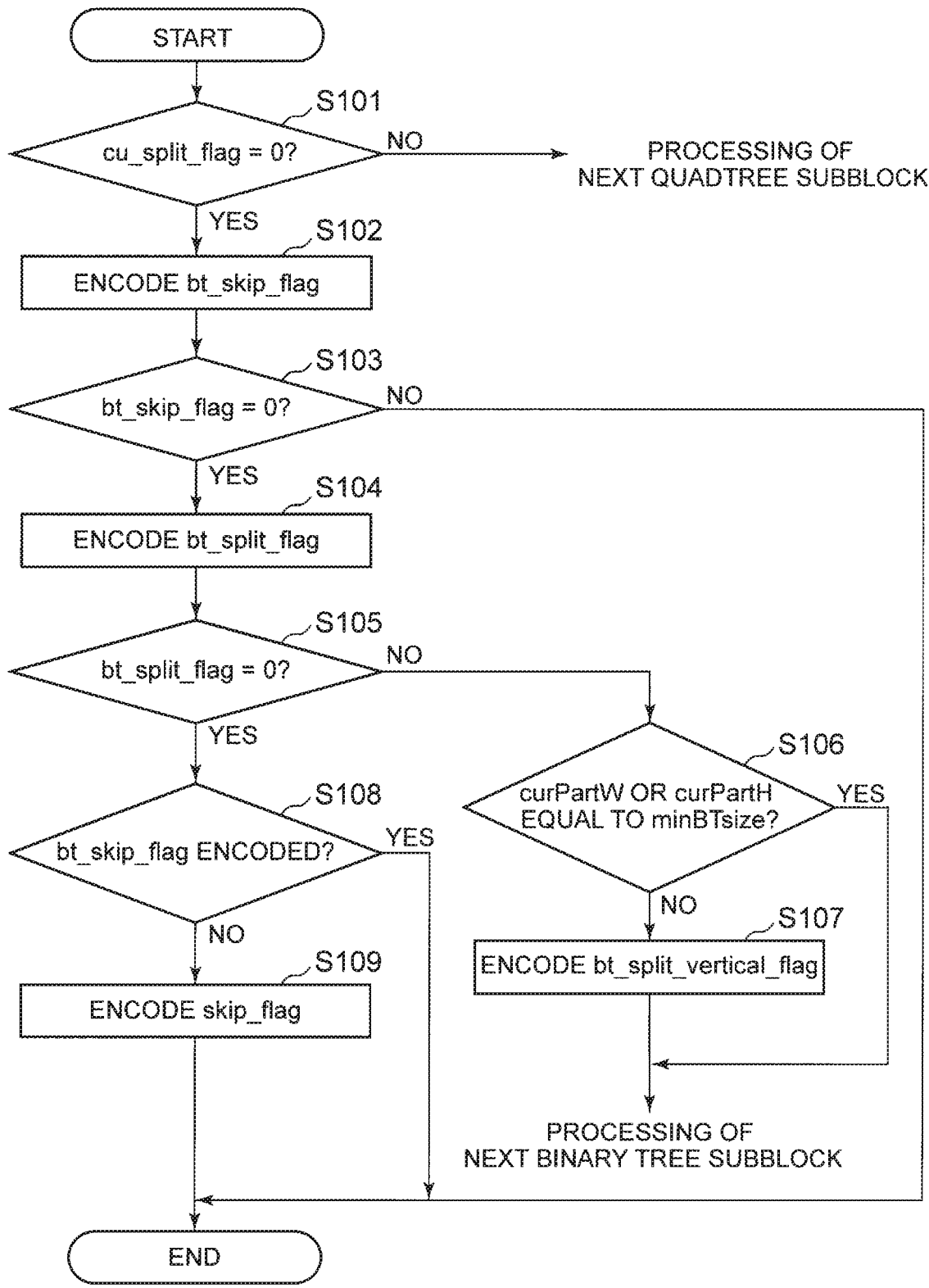
FIG. 2 is a flowchart depicting the operations of an entropy encoding controller and entropy encoder.

The following describes the operations of the entropy encoding controller 107 and entropy encoder 102, which are characteristic parts in this exemplary embodiment, for btskip_flag, bt_split_flag, bt_split_vertical_flag, and skip_flag in more detail, with reference to a flowchart in FIG. 2.

In step S101, the entropy encoding controller 107 determines whether or not cu_split_flag is 0. In the case where cu_split_flag is 0, the process advances to step S102. In the case where cu_split_flag is 1, the process advances to processing the next quadtree subblock (block after partitioning based on the quadtree structure).

In step S102, the entropy encoder 102 entropy-encodes bt_skip_flag. In step S103, the entropy encoding controller 107 determines whether or not bt_skip_flag is 0. In the case where bt_skip_flag is 0, the process advances to step S104. In the case where bt_skip_flag is 1, the process ends.

In step S104, the entropy encoder 102 entropy-encodes bt_split_flag. In step S105, the entropy encoding controller 107 determines whether or not bt_split_flag is 0. In the case where bt_split_flag is 0, the process advances to step S108. In the case where bt_split_flag is 1, the process advances to step S106.

In step S106, the entropy encoding controller 107 determines whether or not curPartW or curPartH is equal to minBTsize. When any of curPartW and curPartH is equal to minBTsize, the process advances to processing the next binary tree subblock (block after partitioning based on the binary tree structure). In other words, the entropy encoding controller 107 skips the entropy encoding process of bt_split_vertical_flag (sets "encoding OFF"). The processing of the next binary tree subblock corresponds to the process from step S102 onward. When neither curPartW nor curPartH is equal to minBTsize, the process advances to step S107.

In step S107, the entropy encoder 102 entropy-encodes bt_split_vertical_flag. The process then advances to processing the next binary tree subblock.

Through steps S105 to S107, the entropy encoding controller 107 skips the entropy encoding process of bt_split_vertical_flag in the case where bt_split_flag of the subblock to be processed is 1 (i.e. the block to be processed is further partitioned based on the binary tree structure) and any of curPartW and curPartH is equal to minBTsize.

In step S108, the entropy encoder 102 determines whether or not bt_skip_flag is entropy-encoded. In the case where bt_skip_flag is not entropy-encoded, the process advances to step S109. In the case where bt_skip_flag is entropy-encoded, the process ends.

In step S109, the entropy encoder 102 entropy-encodes skip_flag. The process then ends.

Figure 3:
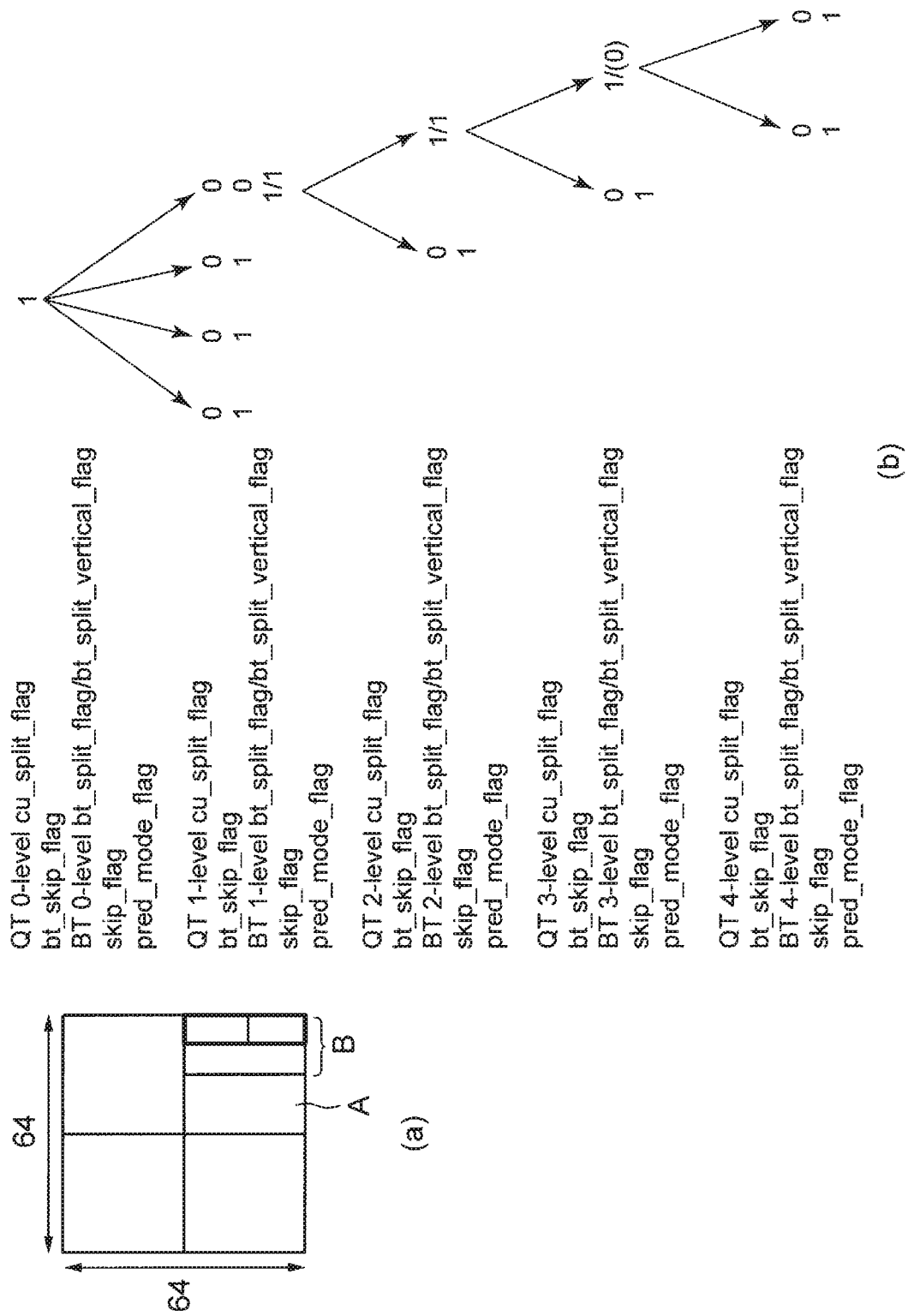
FIG. 3 is an explanatory diagram depicting a QTBT structure in Exemplary Embodiment 1.

A specific example of this exemplary embodiment is described below. FIG. 3 is an explanatory diagram depicting a QTBT structure in Exemplary Embodiment 1.

An example of block partitioning is shown in (a) of FIG. 3. In (b) of FIG. 3, the syntax elements and QTBT structure, which correspond to the partitioning shown in (a) of FIG. 3, is shown.

In the example shown in (a) of FIG. 3, a 64×64 (64 pixels×64 pixels) block is split into four 32×32 blocks (subblocks) based on the quadtree structure. Accordingly, at QT 0-level (depth 0), the cu_split_flag value indicates partitioning (1 in this exemplary embodiment).

At QT 1-level (depth 1), the lower right 32×32 block is split into two in the vertical direction. For the 32×32 block, the cu_split_flag value indicates non-partitioning (0 in this exemplary embodiment), but the bt_split_flag value at BT 1-level (depth 1) indicates partitioning (1 in this exemplary embodiment). Moreover, the bt_split_vertical_flag value indicates the vertical direction (1 in this exemplary embodiment). For the other 32×32 blocks, the bt_skip_flag value indicating whether or not succeeding encoded data is present indicates that succeeding encoded data is not present (1 in this exemplary embodiment). While "encoding ON" is set for bt_skip_flag of the four 32×32 blocks (because cu_split_flag is 0), "encoding ON" is set for entropy encoding control of bt_split_flag only for the lower right 32×32 block. "encoding OFF" is set for the other three 32×32 blocks.

At BT 2-level (depth 2), for the left 16×32 block A included in the lower right 32×32 block, the bt_split_flag value indicates non-partitioning (0 in this exemplary embodiment), as the block is subjected to no more partitioning. The skip_flag value is 1.

For the right 16×32 block B, the bt_split_flag value indicates partitioning (1 in this exemplary embodiment), as the block is subjected to further partitioning. The btLsplit_vertical_flag value indicates the vertical direction (1 in this exemplary embodiment). minBTsize is not reached by any of the width (curPartW), i.e. 16, and the height (curPartH), i.e. 32.

At BT 3-level (depth 3), the left 8×32 block included in the lower right 16×32 block B is not subjected to partitioning. Accordingly, the bt_split_flag value indicates non-partitioning (0 in this exemplary embodiment), and the skip_flag value is 1.

For the right 8×32 block (the block enclosed by the thick line in (a) of FIG. 3), the bt_split_flag value indicates partitioning (1 in this exemplary embodiment), as the block is subjected to further partitioning. Meanwhile, since curPartW is equal to minBTsize (=8), bt_split_vertical_flag is not entropy-encoded and transmitted. In other words, the entropy encoding controller 107 sets "encoding OFF" for entropy encoding control of bt_split_vertical_flag.

At BT 4-level (depth 4), the upper 8×16 block and the lower 8×16 block included in the lower right 8×32 block are both not subjected to partitioning. Accordingly, for each of the blocks, the bt_split_flag value indicates non-partitioning (0 in this exemplary embodiment), and the skip_flag value is 1.

The example shown in (a) of FIG. 3 is the same as the example shown in (a) of FIG. 18. In (b) of FIG. 18, an example, where the quadtree split flag, the binary tree split flag, and the binary tree split direction flag are used strictly, is shown. In the example shown in (b) of FIG. 18, the number of bits necessary to express the QTBT structure is 21. On the other hand, in the example shown in (b) of FIG. 3, the number of bits (the number of bins) necessary to express the QTBT structure is reduced to 21.

With the video encoding device using the above-mentioned entropy encoding controller 107 and entropy encoder 102 according to this exemplary embodiment, redundant transmission of the binary tree split flag and the binary tree split direction flag is prevented to improve compression performance. Moreover, redundant entropy encoding processing of the binary tree split flag and the binary tree split direction flag is reduced, and processing complexity is reduced.

Exemplary Embodiment 2

Figure 4:
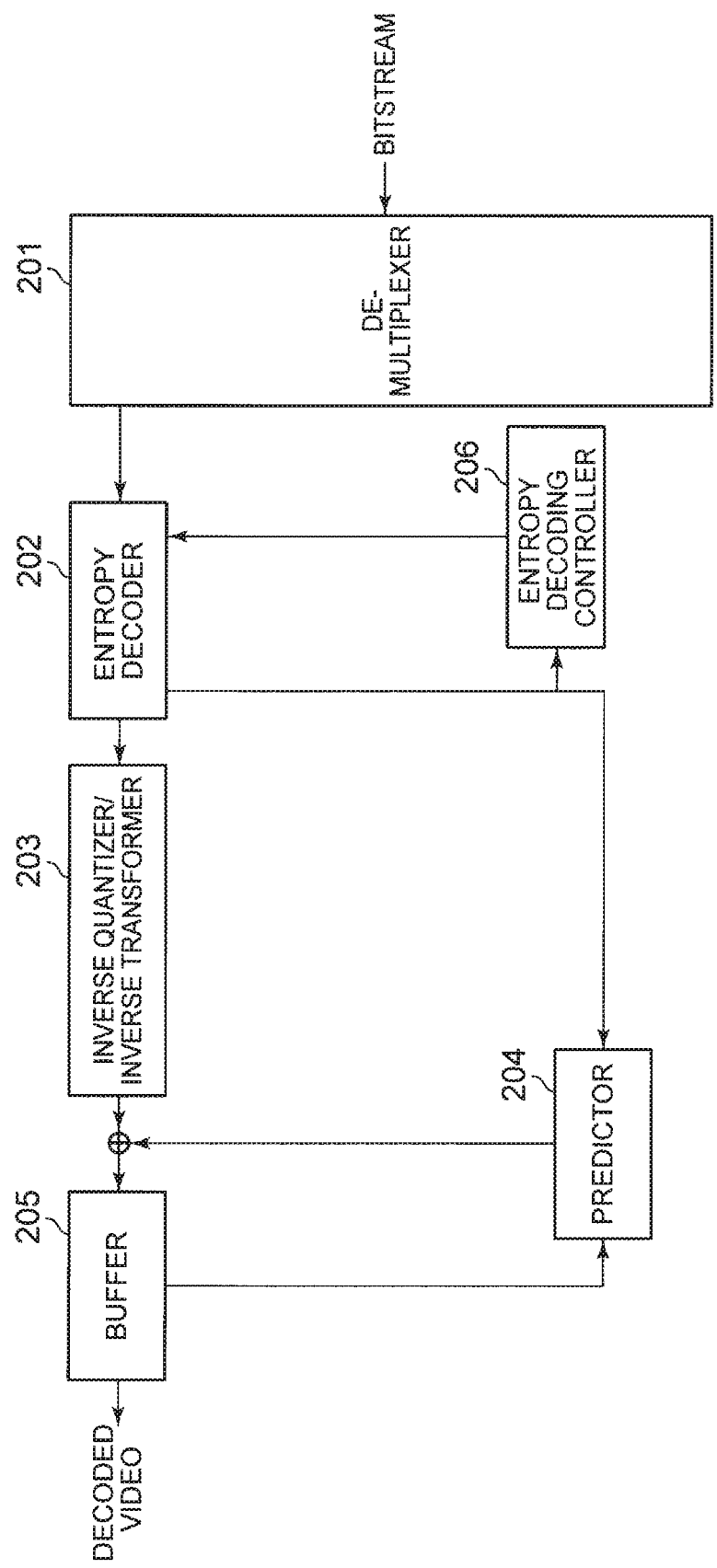
FIG. 4 is a block diagram depicting a video decoding device according to Exemplary Embodiment 2.

FIG. 4 is a block diagram depicting an exemplary embodiment (Exemplary Embodiment 2) of a video decoding device. The video decoding device depicted in FIG. 4 includes a de-multiplexer 201, an entropy decoder 202, an inverse quantizer/inverse transformer 203, a predictor 204, a buffer 205, and an entropy decoding controller 206.

The de-multiplexer 201 de-multiplexes an input bitstream to extract entropy-encoded data.

The entropy decoder 202 entropy-decodes the entropy-encoded data. The entropy decoder 202 supplies the entropy-decoded transform quantization value to the inverse quantizer/inverse transformer 203, and further supplies cu_split_flag, bt_skip_flag, bt_split_flag, bt_split_vertical_flag, skip_flag, pred_mode_flag, split_tu_flag, intra prediction direction, and motion vector.

Here, when "decoding OFF" is set for entropy decoding control of any of bt_skip_flag, bt_split_flag, bt_split_vertical_flag, and skip_flag as supplied from the entropy decoding controller 206, the entropy decoder 202 in this exemplary embodiment skips entropy-decoding it. Each decoded value upon skip is set as follows.

When skipping entropy decoding control of bt_skip_flag, the entropy decoder 202 sets btskip_flag to 0. In other words, in the case where bt_skip_flag is not present in the bitstream, the entropy decoder 202 implicitly interprets bt_skip_flag=0.

When skipping entropy decoding control of bt_split_flag and bt_split_vertical_flag, the entropy decoder 202 sets bt_split_flag to 0. In other words, in the case where bt_split_flag is not present in the bitstream, the entropy decoder 202 implicitly interprets bt_split_flag=0. When skipping entropy decoding control of bt_split_vertical_flag, the entropy decoder 202 may set bt_split_vertical_flag to any of 0 and 1.

When skipping entropy decoding control of skip_flag, the entropy decoding controller 206 sets skip_flag to 1 in the case where the decoded value of bt_skip_flag is 1. Otherwise, the entropy decoding controller 206 sets skip_flag to 0.

The entropy decoding controller 206 monitors cu_split_flag, bt_skip_flag, bt_split_flag, bt_split_vertical_flag, and skip_flag supplied from the entropy decoder 202, and sets the respective entropy decoding control ("decoding ON" or "decoding OFF") as follows.

When entropy-decoded cu_split_flag of the subblock to be processed is 0, the entropy decoding controller 206 sets "decoding ON" for entropy decoding control of bt_skip_flag. Otherwise, the entropy decoding controller 206 sets "decoding OFF".

When entropy-decoded bt_skip_flag of the subblock to be processed is 0, the entropy decoding controller 206 sets "decoding ON" for entropy decoding control of bt_split_flag. Otherwise, the entropy decoding controller 206 sets "decoding OFF".

When entropy-decoded bt_split_flag of the subblock to be processed is 1, the entropy decoding controller 206 sets "decoding ON" for entropy decoding control of bt_split_vertical_flag. Otherwise, the entropy decoding controller 206 sets "decoding OFF".

Here, even in the case where bt_split_flag of the subblock to be processed is 1, the entropy decoding controller 206 sets "decoding OFF" for entropy decoding control of bt_split_vertical_flag if the width or height of the subblock to be processed is equal to the minimum size.

When entropy decoding control of bt_skip_flag of the subblock to be processed is "decoding OFF" and entropy-decoded bt_split_flag is 0, the entropy decoding controller 206 sets "decoding ON" for entropy decoding control of skip_flag. Otherwise, the entropy decoding controller 206 sets "decoding OFF".

By the above-mentioned setting, bt_skip_flag is entropy-decoded only for a block of an end node in a quadtree structure, and when the value is 1, entropy decoding of bt_split_flag, bt_split_vertical_flag, and skip_flag is not performed.

The inverse quantizer/inverse transformer 203 inverse-quantizes the transform quantization value with a quantization step size. The inverse quantizer/inverse transformer 203 further inverse-frequency-transforms the frequency transform coefficient obtained by the inverse quantization.

The predictor 204 generates a prediction signal of each subblock, based on cu_split_flag, bt_skip_flag, bt_split_flag, bt_split_vertical_flag, skip_flag, pred_mode_flag, split_tu_flag, intra prediction direction, and, motion vector. The prediction signal is generated based on the above-mentioned intra prediction or inter-frame prediction.

The prediction signal supplied from the predictor 204 is added to the reconstructed prediction error image obtained by the inverse frequency transform by the inverse quantizer/inverse transformer 203, and the result is supplied to the buffer 205 as a reconstructed picture. The reconstructed picture stored in the buffer 205 is then output as a decoded image.

The video decoding device according to this exemplary embodiment generates a decoded image by the operation described above.

Figure 5:
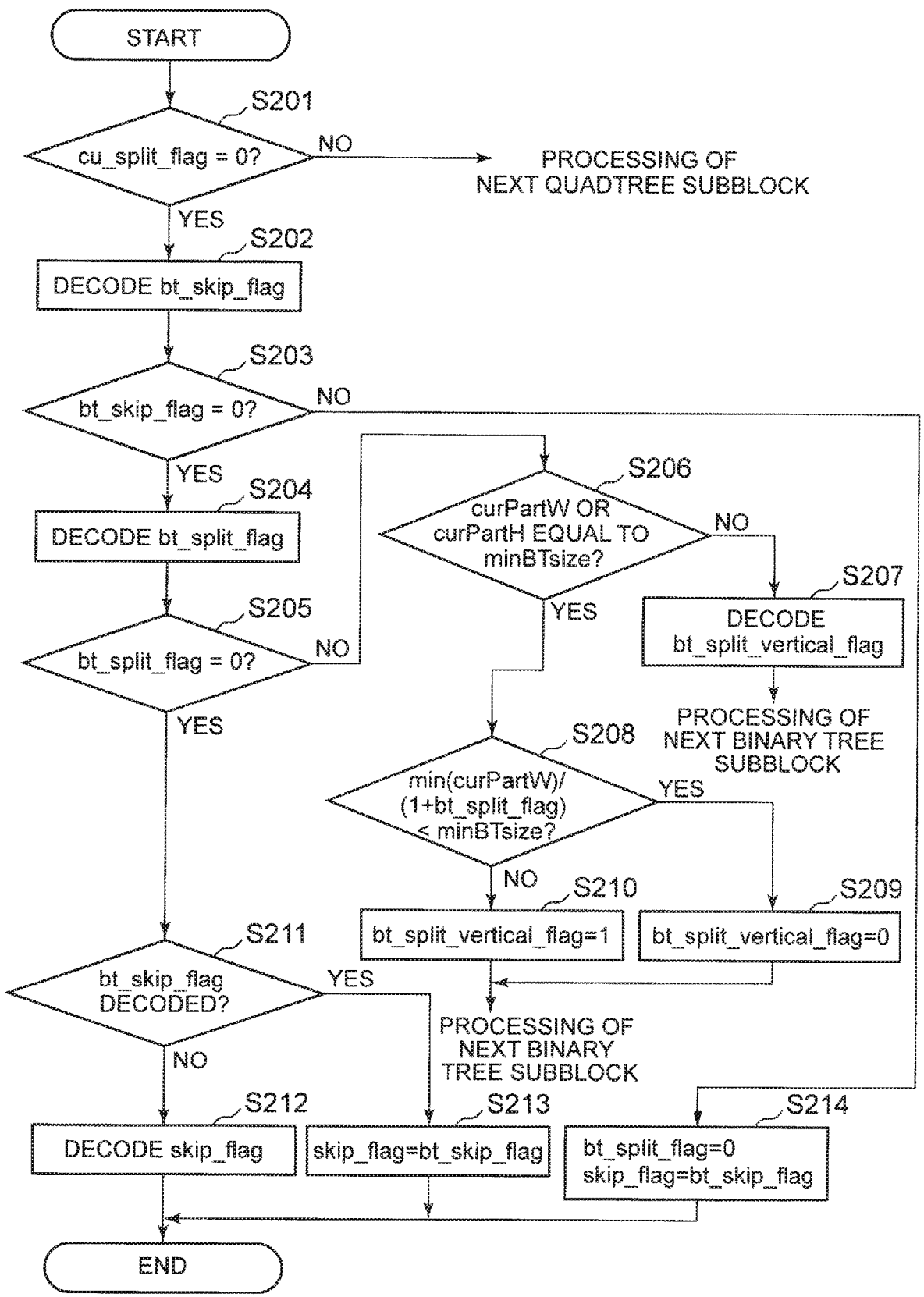
FIG. 5 is a flowchart depicting the operations of an entropy decoding controller and entropy decoder.

The following describes the operations of the entropy decoding controller 206 and entropy decoder 202, which are characteristic parts in this exemplary embodiment, for btskip_flag, bt_split_flag, bt_split_vertical_flag, and skip_flag in more detail, with reference to a flowchart in FIG. 5.

In step S201, the entropy decoding controller 206 determines whether or not entropy-decoded cu_split_flag is 0. In the case where cu_split_flag is 0, the process advances to step S202. In the case where cu_split_flag is 1, the process advances to processing the next quadtree subblock.

In step S202, the entropy decoder 202 entropy-decodes bt_skip_flag. Here, when skipping entropy decoding control of bt_skip_flag, the entropy decoder 202 sets bt_skip_flag to 0, as mentioned above.

In step S203, the entropy decoding controller 206 determines whether or not entropy-decoded bt_skip_flag is 0. In the case where btskip_flag is 0, the process advances to step S204. In the case where bt_skip_flag is 1, the process advances to step S214.

In step S204, the entropy decoder 202 entropy-decodes bt_split_flag. Following this, in step S205, the entropy decoding controller 206 determines whether or not entropy-decoded bt_split_flag is 0. In the case where bt_split_flag is 0, the process advances to step S211. In the case where bt_split_flag is 1, the process advances to step S206.

In step S206, the entropy decoding controller 206 determines whether or not curPartW or curPartH is equal to minBTsize. In the case where any of curPartW and curPartH is equal to minBTsize, the process advances to step S208. In other words, the entropy decoding controller 206 causes the entropy decoder 202 to skip the entropy decoding process of bt_split_vertical_flag (sets "decoding OFF"). In the case where neither curPartW nor curPartH is equal to minBTsize, the process advances to step S207.

In step S207, the entropy decoder 202 entropy-decodes bt_split_vertical_flag of the subblock to be processed. The process then advances to processing the next binary tree subblock (block after partitioning based on the binary tree structure). The processing of the next binary tree subblock corresponds to the process from step S202 onward.

In steps S208 to S210, the entropy decoding controller 206 derives the bt_split_vertical_flag value for which the entropy decoding process is skipped.

In detail, in step S208, the entropy decoding controller 206 determines whether or not min(curPartW)/(1+bt_split_flag)<minBTsize. In the case where min(curPartW)/(1+bt_split_flag)<minBTsize, the entropy decoding controller 206 sets the bt_split_vertical_flag value to 0 (indicating splitting in the horizontal direction) in step S209.

In the case where min(curPartW)/(1+bt_split_flag)≥minBTsize, the entropy decoding controller 206 sets the bt_split_ vertical_flag value to 1 (indicating splitting in the vertical direction) in step S210. The process then advances to processing the next binary tree subblock (block after partitioning based on the binary tree structure).

min(curPartW)/(1+bt_split_flag)<minBTsize is the condition that, when further partitioning the subblock to be processed based on the binary tree structure, the width of a subblock after the partitioning is less than minBTsize. Hence, the entropy decoding controller 206 may use a condition "min(curPartH)/(1+bt_split_flag)<minBTsize" in step S208, to set the bt_split_vertical_flag value to 1 (indicating splitting in the vertical direction) in the case where min(curPartH)/(1+bt_split_flag)<minBTsize and set the bt_split_vertical_flag value to 0 (indicating splitting in the horizontal direction) in the case where min(curPartH)/(1+bt_split_flag)≥minBTsize.

In step S211, the entropy decoder 202 determines whether or not bt_skip_flag is entropy-decoded. In the case where btskip_flag is not entropy-decoded (in the case where entropy decoding control of bt_skip_flag is skipped), the process advances to step S212. In the case where bt_skip_flag is entropy-decoded, the process advances to step S213.

In step S212, the entropy decoder 202 entropy-decodes skip_flag. The process then ends.

In step S213, the entropy decoder 202 sets skip_flag to the entropy-decoded bt_skip_flag value, without entropy-decoding skip_flag. The process then ends.

In step S214, the entropy decoder 202 sets bt_split_flag to 0 and skip_flag to the entropy-decoded bt_skip_flag value, without entropy-decoding bt_split_flag and skip_flag. The process then ends.

The advantageous effects of this exemplary embodiment are described below. With the video decoding device using the above-mentioned entropy decoding controller 206 and entropy decoder 202 according to this exemplary embodiment, redundant entropy decoding of the binary tree split flag and binary tree split direction flag is prevented to reduce processing complexity.

In Exemplary Embodiments 1 and 2, special entropy encoding control and entropy decoding control are performed for skip_flag, in order to eliminate redundancy between bt_skip_flag and skip_flag. In the case where redundancy elimination is not required, however, special entropy encoding control and entropy decoding control for skip_flag need not be performed.

The advantages of eliminating redundancy are as follows.

Redundant entropy encoding process and entropy decoding process of skip_flag and redundant entropy encoding process and entropy decoding process of bt_split_vertical_flag in video encoding and video decoding can be reduced. Moreover, interoperability between video encoding and video decoding can be improved by preventing any error in combining parameter values.

Exemplary Embodiments 1 and 2 describe the case where the definition of bt_skip_flag and skip_flag is "succeeding encoded data is not present" for simplicity's sake. However, encoded data of motion vector information for merge prediction or the like may succeed as an exception.

Although Exemplary Embodiments 1 and 2 describe the case where minBTsize means both the minimum width and the minimum height, the minimum width and the minimum height may be set separately. In such a case, in step S106 in FIG. 2 and step S206 in FIG. 5, curPartW is compared with the minimum width, and curPartH is compared with the minimum height.

Each of the foregoing exemplary embodiments may be realized by hardware or a computer program.

Figure 6:
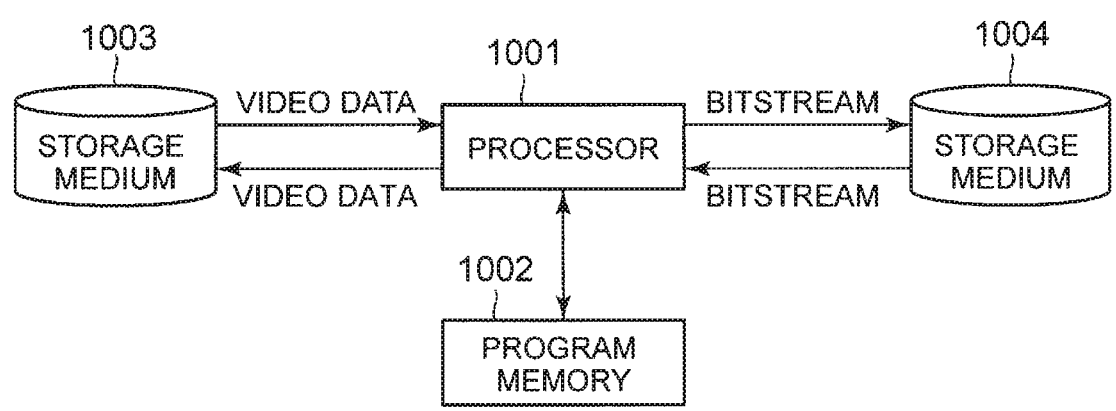
FIG. 6 is a block diagram depicting an example of the structure of an information processing system capable of realizing the functions of a video encoding device.

An information processing system depicted in FIG. 6 includes a processor 1001, a program memory 1002, a storage medium 1003 for storing video data, and a storage medium 1004 for storing a bitstream. The storage medium 1003 and the storage medium 1004 may be separate storage media, or storage areas included in the same storage medium. A magnetic storage medium such as a hard disk is available as a storage medium.

In the information processing system depicted in FIG. 6, a program for realizing the functions of the blocks (except the buffer block) depicted in each of FIGS. 1 and 4 is stored in the program memory 1002. The processor 1001 realizes the functions of the video encoding device and video decoding device according to the foregoing exemplary embodiments, by executing processes according to the program stored in the program memory 1002.

Figure 7:
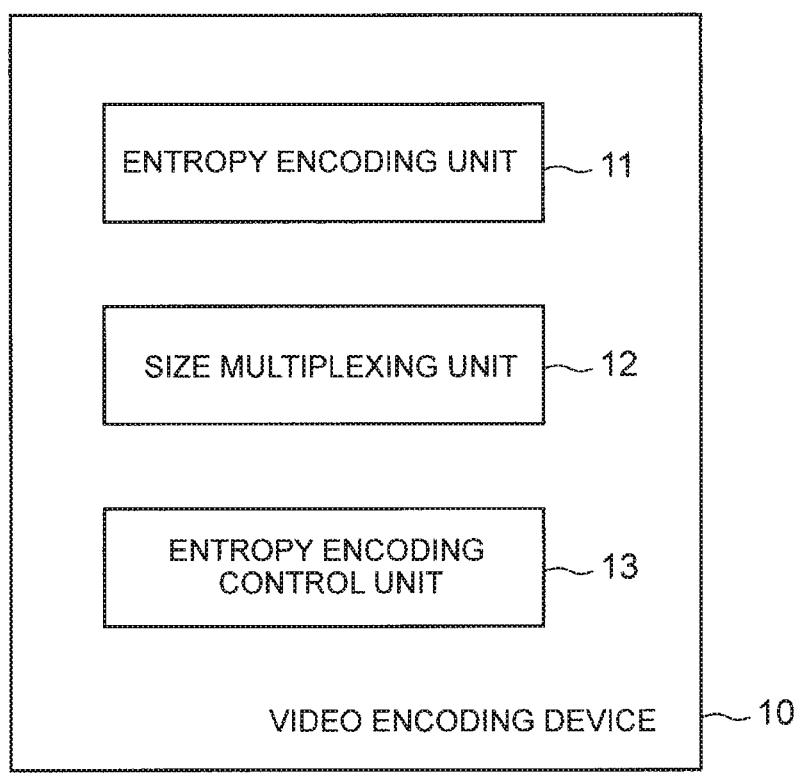
FIG. 7 is a block diagram depicting main parts of a video encoding device.

FIG. 7 is a block diagram depicting main parts of a video encoding device. As depicted in FIG. 7, a video encoding device 10 comprises: an entropy encoding unit 11 (realized by the entropy encoder 102 in the exemplary embodiment) for entropy-encoding at least a quadtree split flag (e.g. cu_split_flag), a skip flag (e.g. bt_skip_flag), a binary tree split flag (e.g. bt_split_flag), and a binary tree split direction flag (e.g. bt_split_vertical_flag); a size multiplexing unit 12 (realized by the multiplexer 106 in the exemplary embodiment) for multiplexing information (e.g. minBTsize) indicating a minimum size of partitioning based on a binary tree structure, in a bitstream; and an entropy encoding control unit 13 (realized by the entropy encoding controller 107 in the exemplary embodiment) for controlling the entropy encoding unit 11, wherein the entropy encoding control unit 13, in the case where the skip flag of a block of an end node in a quadtree structure indicates that the binary tree split flag succeeds (e.g. when bt_skip_flag=0), causes the entropy encoding unit 11 to entropy-encode the binary tree split flag and the binary tree split direction flag, and in the case where the skip flag of the block of the end node in the quadtree structure indicates that the binary tree split flag does not succeed (e.g. when bt_skip_flag=1), causes the entropy encoding unit 11 not to entropy-encode the binary tree split flag and the binary tree split direction flag (e.g. sets "encoding OFF"), and wherein in the case where a node of a size equal to the minimum size is further partitioned based on the binary tree structure, the entropy encoding control unit 13 causes the entropy encoding unit 11 not to entropy-encode the binary tree split direction flag at the node (e.g. sets "encoding OFF").

Figure 8:
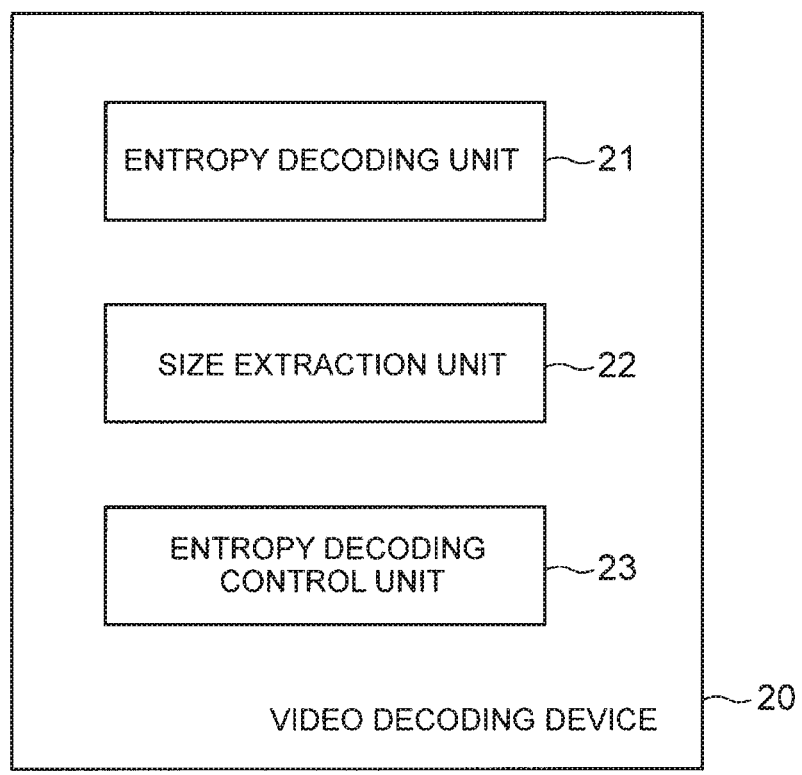
FIG. 8 is a block diagram depicting main parts of a video decoding device.
Figure 9:
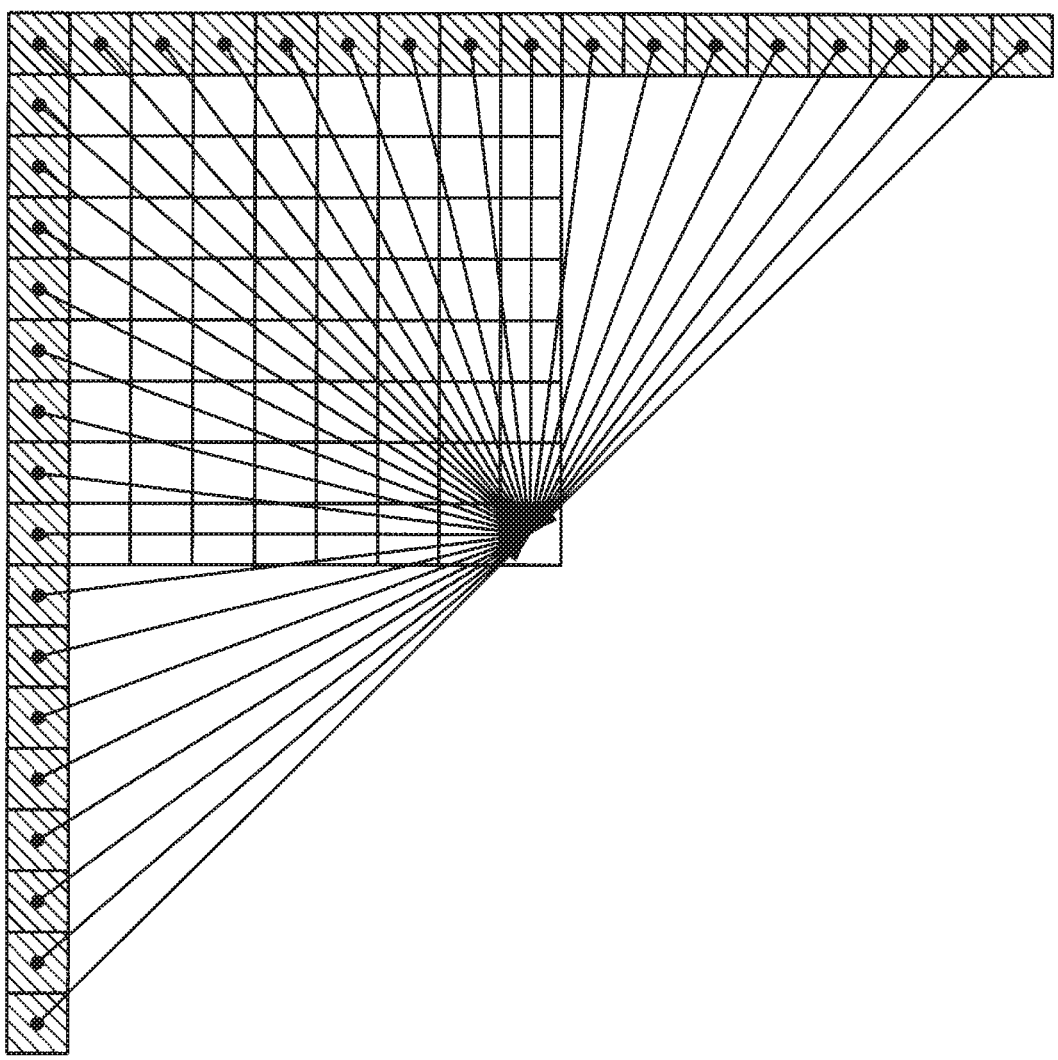
FIG. 9 is an explanatory diagram depicting an example of 33 types of angular intra prediction.
Figure 10:
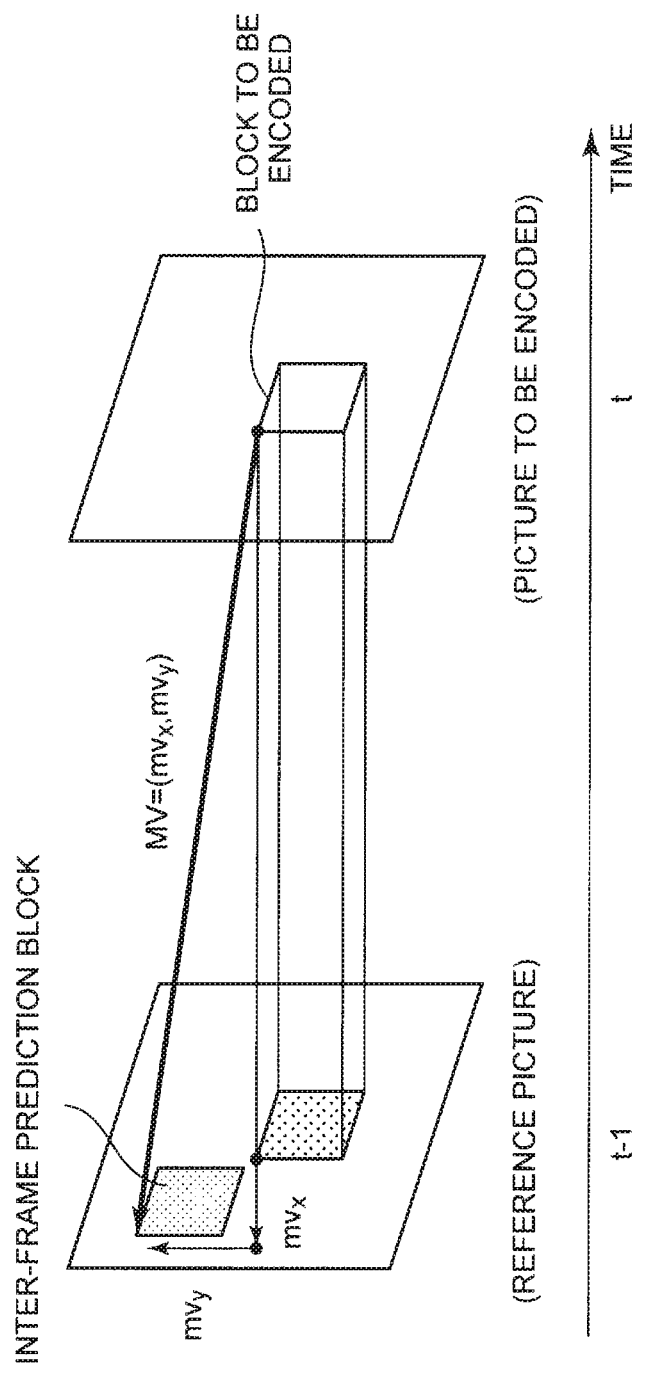
FIG. 10 is an explanatory diagram depicting an example of inter-frame prediction.
Figure 11:
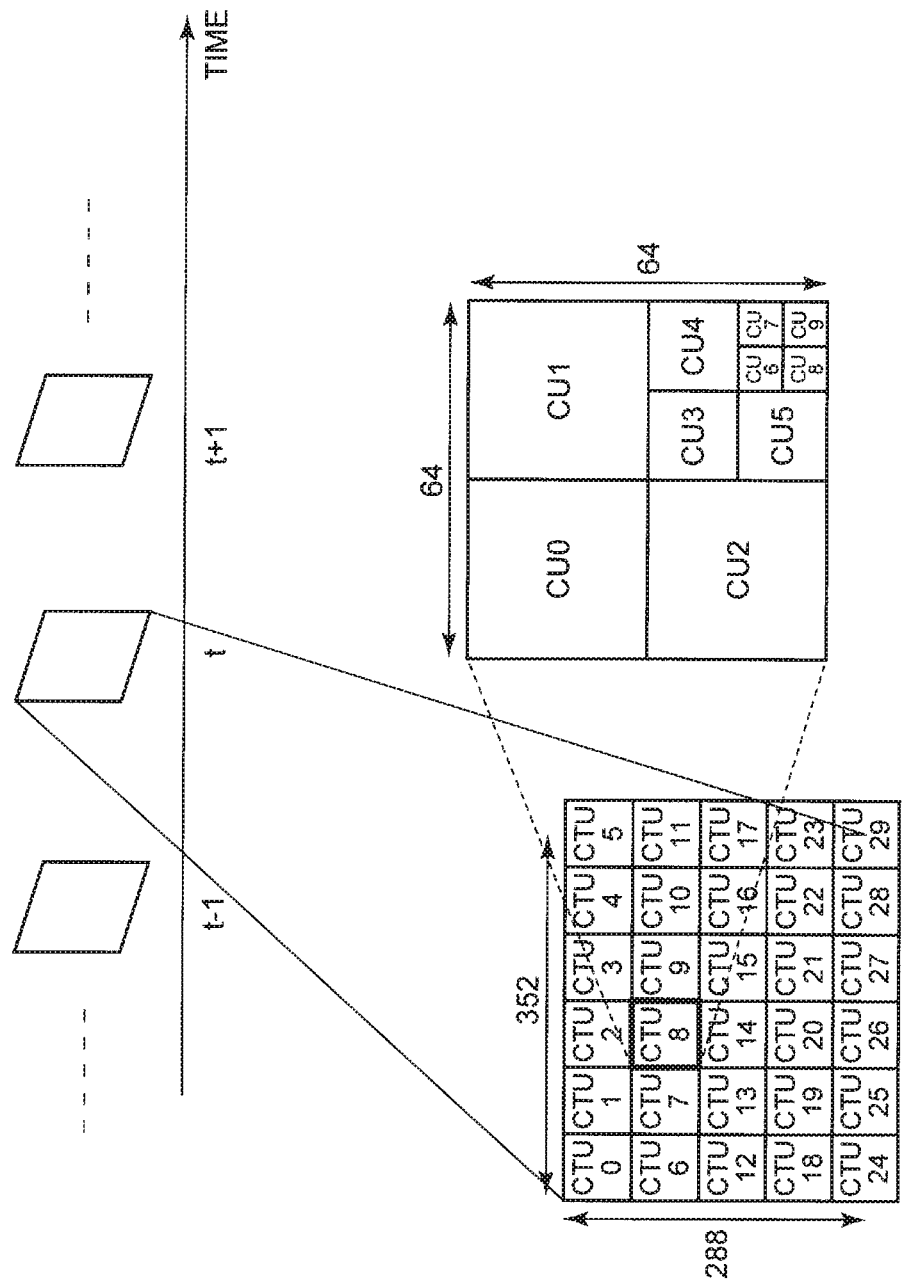
FIG. 11 is an explanatory diagram depicting an example of CTU partitioning of a frame t and an example of CU partitioning of CTU8 of the frame t.
Figure 12:
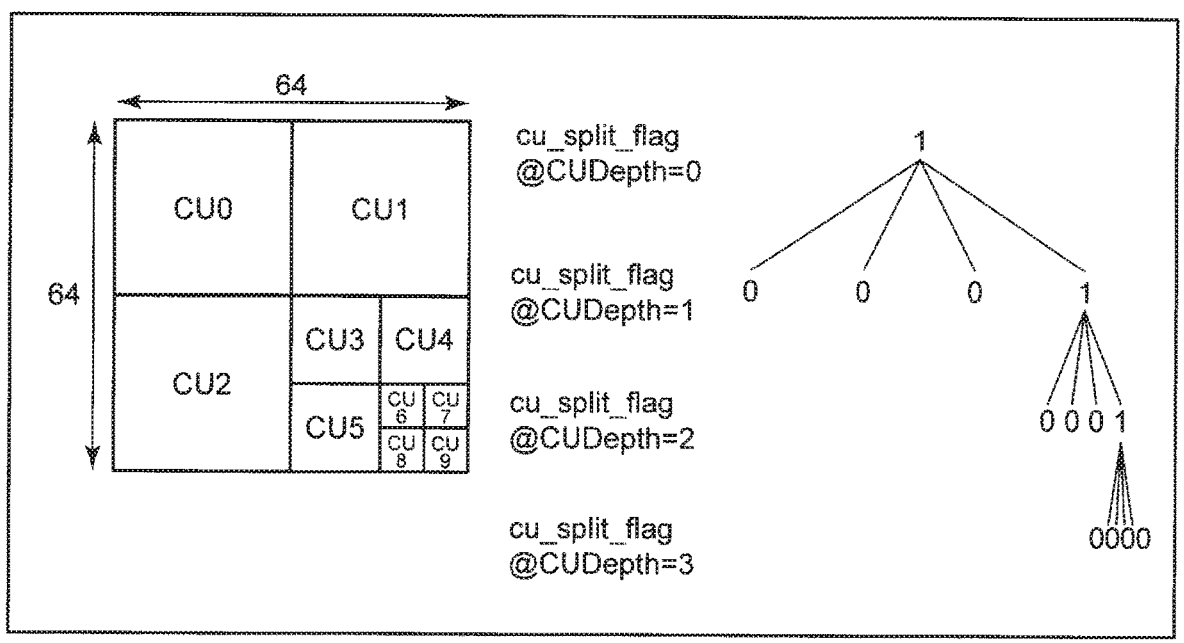
FIG. 12 is an explanatory diagram depicting a quadtree structure corresponding to the example of CU partitioning of CTU8.
Figure 13:
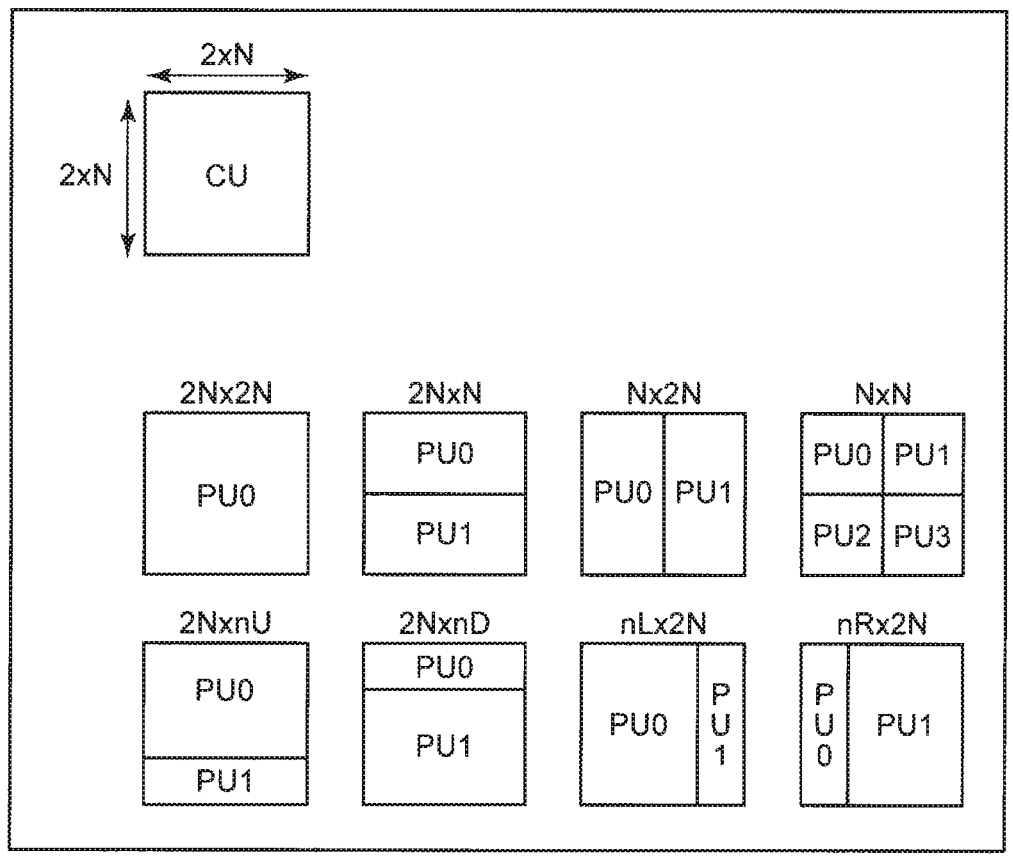
FIG. 13 is an explanatory diagram depicting examples of PU partitioning of a CU.
Figure 14:
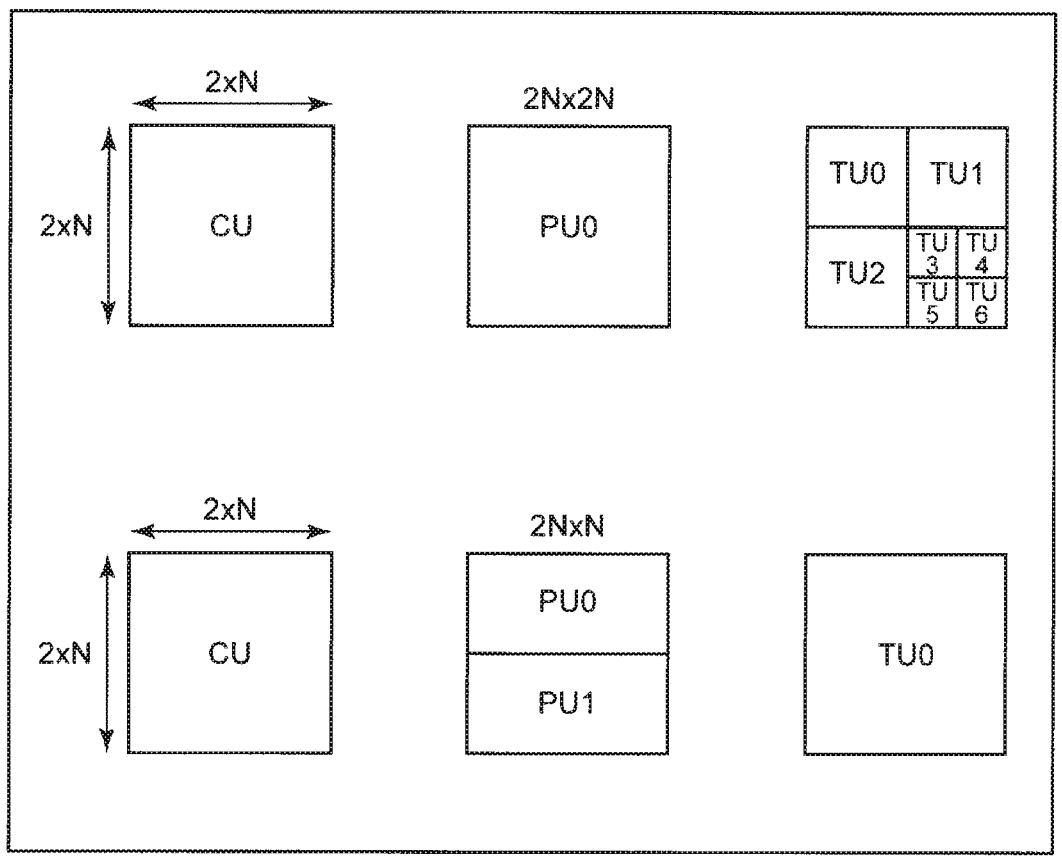
FIG. 14 is an explanatory diagram depicting examples of TU partitioning of a CU.
Figure 15:
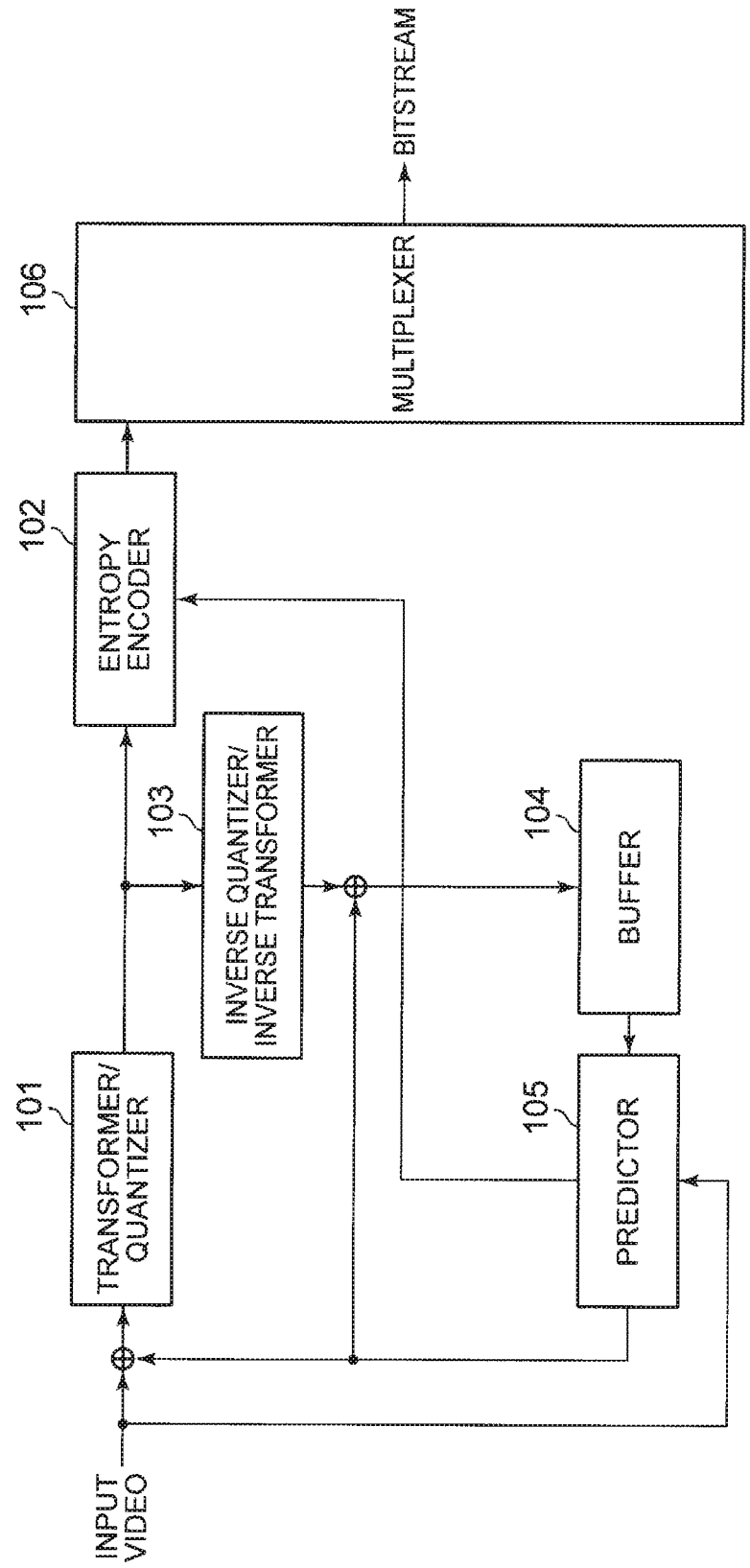
FIG. 15 is a block diagram depicting an example of the structure of a typical video encoding device.
Figure 16:
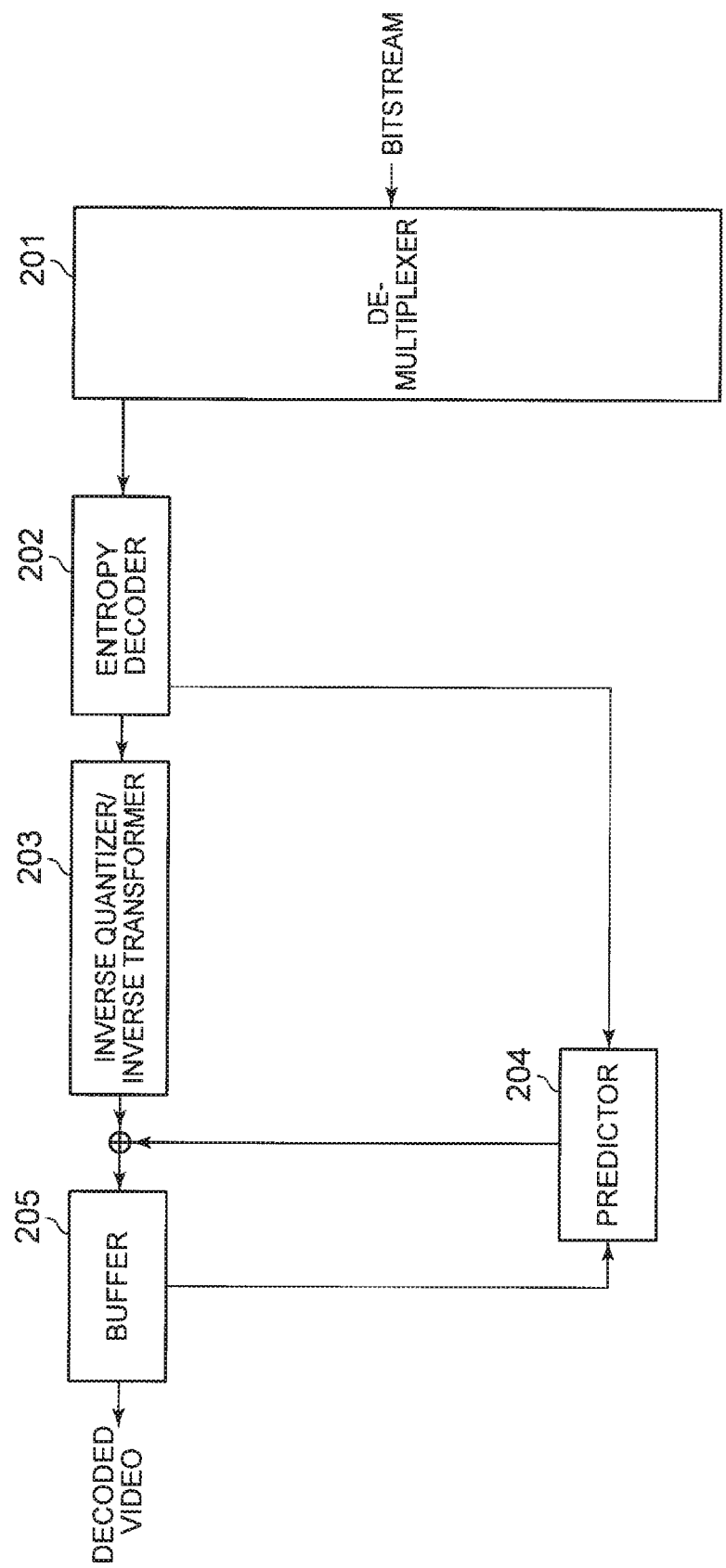
FIG. 16 is a block diagram depicting an example of the structure of a typical video decoding device.

FIG. 8 is a block diagram depicting main parts of a video decoding device. As depicted in FIG. 8, a video decoding device 20 comprises: an entropy decoding unit 21 (realized by the entropy decoder 202 in the exemplary embodiment) for entropy-decoding at least a quadtree split flag (e.g. cu_split_flag), a skip flag (e.g. bt_skip_flag), a binary tree split flag (e.g. bt_split_flag), and a binary tree split direction flag (e.g. bt_split_vertical_flag); a size extraction unit 22 (realized by the de-multiplexer 201 in the exemplary embodiment) for extracting information (e.g. minBTsize) indicating a minimum size of partitioning based on a binary tree structure, from a bitstream; and an entropy decoding control unit 23 (realized by the entropy decoding controller 206 in the exemplary embodiment) for controlling the entropy decoding unit 21, wherein the entropy decoding control unit 23, in the case where the skip flag of a block of an end node in a quadtree structure indicates that the binary tree split flag succeeds (e.g. when bt_skip_flag=0), causes the entropy decoding unit 21 to entropy-decode the binary tree split flag and the binary tree split direction flag, and in the case where the skip flag of the block of the end node in the quadtree structure indicates that the binary tree split flag does not succeed (e.g. when bt_skip_flag=1), causes the entropy decoding unit 21 not to entropy-decode the binary tree split flag and the binary tree split direction flag (e.g. sets "decoding OFF"), and wherein in the case where a node of a size equal to the minimum size is further partitioned based on the binary tree structure, the entropy decoding control unit 23 causes the entropy decoding unit 21 not to entropy-decode the binary tree split direction flag at the node.

The entropy decoding control unit 22 may interpret the binary tree split flag that is not entropy-decoded, as indicating that partitioning based on a binary tree structure is not performed (e.g. when bt_skip_flag=1, bt_split_flag is set to 0), in the case where the skip flag of the block of the end node in the quadtree structure is 1.

The video decoding device 20 may include a size setting unit (realized by the entropy decoding controller 206 in the exemplary embodiment) for setting a value meeting the minimum size, as a value of the binary tree split direction flag that is not entropy-decoded. The value meeting the minimum size is a value for specifying that partitioning into a subblock smaller than the minimum size is not performed (specifically, both the width and the height do not fall below the minimum value).

Although the present invention has been described with reference to the foregoing exemplary embodiments and examples, the present invention is not limited to the foregoing exemplary embodiments and examples. Various changes understandable by those skilled in the art can be made to the structures and details of the present invention within the scope of the present invention.

REFERENCE SIGNS LIST 10 video encoding device
11 entropy encoding unit
12 size multiplexing unit
13 entropy encoding control unit
20 video decoding device
21 entropy decoding unit
22 size extraction unit
23 entropy decoding control unit
101 transformer/quantizer
102 entropy encoder
103 inverse quantizer/inverse transformer
104 buffer
105 predictor
106 multiplexer
107 entropy encoding controller
201 de-multiplexer
202 entropy decoder
203 inverse quantizer/inverse transformer
204 predictor
205 buffer
206 entropy decoding controller
1001 processor
1002 program memory
1003 storage medium
1004 storage medium

The invention claimed is:

1. A video encoding method, implemented by a processor, including an entropy encoding step of entropy-encoding a quadtree split flag, a skip flag, a binary tree split flag, and a binary tree split direction flag, the video encoding method comprising:
   a step of multiplexing information indicating a minimum size of partitioning based on a binary tree structure, in a bitstream; and
   an entropy encoding control step of, in the case where the skip flag of a block of an end node in a quadtree structure indicates that the binary tree split flag succeeds, causing the entropy encoding step to entropy-encode the binary tree split flag and the binary tree split direction flag, and in the case where the skip flag of the block of the end node of the quadtree structure indicates that the binary tree split flag does not succeed, causing the entropy encoding step not to entropy-encode the binary tree split flag and the binary tree split direction flag, wherein in the case where a node of a size equal to the minimum size is further partitioned based on the binary tree structure, the entropy encoding control step causes the entropy encoding step not to entropy-encode the binary tree split direction flag at the node.

2. A video decoding method, implemented by a processor, including an entropy decoding step of entropy-decoding a quadtree split flag, a skip flag, a binary tree split flag, and a binary tree split direction flag, the video decoding method comprising:

a step of extracting information indicating a minimum size of partitioning based on a binary tree structure, from a bitstream; and an entropy decoding control step of, in the case where the skip flag of a block of an end node in a quadtree structure indicates that the binary tree split flag succeeds, causes the entropy decoding step to entropy-decode the binary tree split flag and the binary tree split direction flag, and in the case where the skip flag of the block of the end node in the quadtree structure indicates that the binary tree split flag does not succeed, causing the entropy decoding step not to entropy-decode the binary tree split flag and the binary tree split direction flag, wherein in the case where a node of a size equal to the minimum size is further partitioned based on the binary tree structure, the entropy decoding control step causes the entropy decoding step not to entropy-decode the binary tree split direction flag at the node.

3. The video decoding method according to claim 2, wherein in the entropy decoding control step, in the case where the skip flag of the block of the end node in the quadtree structure indicates that the binary tree split flag does not succeed, the binary tree split flag that is not entropy-decoded is interpreted as indicating that partitioning based on a binary tree structure is not performed.

4. The video decoding method according to claim 2, wherein a value meeting the minimum size is set as a value of the binary tree split direction flag that is not entropy-decoded.

5. A video encoding device comprising:
a hardware including at least a processor,
the hardware implements,
an entropy encoding unit which entropy-encodes at least a quadtree split flag, a skip flag, a binary tree split flag, and a binary tree split direction flag;
a size multiplexing unit which multiplexes information indicating a minimum size of partitioning based on a binary tree structure, in a bitstream; and
an entropy encoding control unit which controls the entropy encoding unit,
wherein the entropy encoding control unit, in the case where the skip flag of a block of an end node in a quadtree structure indicates that the binary tree split flag succeeds, causes the entropy encoding unit to entropy-encode the binary tree split flag and the binary tree split direction flag, and in the case where the skip flag of the block of the end node in the quadtree structure indicates that the binary tree split flag does not succeed, causes the entropy encoding unit not to entropy-encode the binary tree split flag and the binary tree split direction flag, and wherein in the case where a node of a size equal to the minimum size is further partitioned based on the binary tree structure, the entropy encoding control unit causes the entropy encoding unit not to entropy-encode the binary tree split direction flag at the node.

6. A video decoding device comprising:
a hardware including at least a processor,
the hardware implements,
an entropy decoding unit which entropy-decodes at least a quadtree split flag, a skip flag, a binary tree split flag, and a binary tree split direction flag;
a size extraction unit which extracts information indicating a minimum size of partitioning based on a binary tree structure, from a bitstream; and
an entropy decoding control unit which controls the entropy decoding unit,
wherein the entropy decoding control unit, in the case where the skip flag of a block of an end node in a quadtree structure indicates that the binary tree split flag succeeds, causes the entropy decoding unit to entropy-decode the binary tree split flag and the binary tree split direction flag, and in the case where the skip flag of the block of the end node in the quadtree structure indicates that the binary tree split flag does not succeed, causes the entropy decoding unit not to entropy-decode the binary tree split flag and the binary tree split direction flag, and wherein in the case where a node of a size equal to the minimum size is further partitioned based on the binary tree structure, the entropy decoding control unit causes the entropy decoding unit not to entropy-decode the binary tree split direction flag at the node.

7. The video decoding device according to claim 6, further comprising
wherein in the case where the skip flag of the block of the end node in the quadtree structure indicates that the binary tree split flag does not succeed, the entropy decoding control unit interprets the binary tree split flag that is not entropy-decoded, as indicating that partitioning based on a binary tree structure is not performed.

8. A non-transitory computer readable information recording medium storing a video encoding program for causing a computer to execute a process including an entropy encoding process of entropy-encoding a quadtree split flag, a skip flag, a binary tree split flag, and a binary tree split direction flag, the video encoding program further causing the computer to execute:
a process of multiplexing information indicating a minimum size of partitioning based on a binary tree structure, in a bitstream; and
an entropy encoding control process of, in the case where the skip flag of a block of an end node in a quadtree structure indicates that the binary tree split flag succeeds, causing the entropy encoding process to entropy-encode the binary tree split flag and the binary tree split direction flag, and in the case where the skip flag of the block of the end node in the quadtree structure indicates that the binary tree split flag does not succeed, causing the entropy encoding process not to entropy-encode the binary tree split flag and the binary tree split direction flag, wherein in the entropy encoding control process, in the case where a node of a size equal to the minimum size is further partitioned based on the binary tree structure, the video encoding program further causing the entropy encoding process not to entropy-encode the binary tree split direction flag at the node.

9. A non-transitory computer readable information recording medium storing a video decoding program for causing a computer to execute a process including an entropy decoding process of entropy-decoding a quadtree split flag, a skip flag, a binary tree split flag, and a binary tree split direction flag, the video decoding program further causing the computer to execute:

a process of extracting information indicating a minimum size of partitioning based on a binary tree structure, from a bitstream; and an entropy decoding control process of, in the case where the skip flag of a block of an end node in a quadtree structure indicates that the binary tree split flag succeeds, causing the entropy decoding process to entropy-decode the binary tree split flag and the binary tree split direction flag, and in the case where the skip flag of the block of the end node in the quadtree structure indicates that the binary tree split flag does not succeed, causing the entropy decoding process not to entropy-decode the binary tree split flag and the binary tree split direction flag, wherein in the entropy decoding control process, in the case where a node of a size equal to the minimum size is further partitioned based on the binary tree structure, the video decoding program further causing the entropy decoding process not to entropy-decode the binary tree split direction flag at the node.

10. The information recording medium according to claim 9, wherein the video decoding program further causing the computer to, in the case where the skip flag of the block of the end node in the quadtree structure indicates that the binary tree split flag does not succeed, interpret the binary tree split flag that is not entropy-decoded, as indicating that partitioning based on a binary tree structure is not performed.

11. The video decoding method according to claim 3, wherein a value meeting the minimum size is set as a value of the binary tree split direction flag that is not entropy-decoded.

12. The video decoding device according to claim 6, wherein the entropy decoding control unit sets a value meeting the minimum size as a value of the binary tree split direction flag that is not entropy-decoded.

13. The video decoding device according to claim 7, wherein the entropy decoding control unit sets a value meeting the minimum size as a value of the binary tree split direction flag that is not entropy-decoded.

14. The information recording medium according to claim 9, wherein a value meeting the minimum size is set as a value of the binary tree split direction flag that is not entropy-decoded.

15. The information recording medium according to claim 10, wherein a value meeting the minimum size is set as a value of the binary tree split direction flag that is not entropy-decoded.

* * * * *

UNITED STATES PATENT AND TRADEMARK OFFICE
CERTIFICATE OF CORRECTION

PATENT NO. : 10,536,724 B2
APPLICATION NO. : 16/080721
DATED : January 14, 2020
INVENTOR(S) : Keiichi Chono It is certified that error appears in the above-identified patent and that said Letters Patent is hereby corrected as shown below:

In the Specification

Column 9, Description of Embodiment, Line 35; Delete "btskip_flag," and insert --bt_skip_flag,-- therefor Column 9, Description of Embodiment, Line 46; Delete "btskip_flag=1" and insert --bt_skip_flag=1-- therefor Column 9, Description of Embodiment, Line 48; Delete "btskip_flag" and insert --bt_skip_flag-- therefor Column 10, Description of Embodiment, Line 19; Delete "btskip_flag" and insert --bt_skip_flag-- therefor Column 10, Description of Embodiment, Line 39; Delete "btskip_flag," and insert --bt_skip_flag,-- therefor Column 10, Description of Embodiment, Line 46; Delete "btskip_flag." and insert --bt_skip_flag.-- therefor Column 10, Description of Embodiment, Line 49; Delete "btskip_flag" and insert --bt_skip_flag-- therefor Column 11, Description of Embodiment, Line 21; Delete "btskip_flag" and insert --bt_skip_flag-- therefor Column 11, Description of Embodiment, Line 57; Delete "btskip_flag," and insert --bt_skip_flag,-- therefor Signed and Sealed this
Fifth Day of May, 2020

Andrei Iancu
*Director of the United States Patent and Trademark Office*

CERTIFICATE OF CORRECTION (continued)
U.S. Pat. No. 10,536,724 B2

Column 13, Description of Embodiment, Lines 5-6; Delete "btLsplit_vertical_flag" and insert --bt_split_vertical_flag-- therefor Column 14, Description of Embodiment, Line 5; Delete "btskip_flag" and insert --bt_skip_flag-- therefor Column 15, Description of Embodiment, Line 14; Delete "btskip_flag," and insert --bt_skip_flag,-- therefor Column 15, Description of Embodiment, Line 27; Delete "btskip_flag" and insert --bt_skip_flag-- therefor Column 16, Description of Embodiment, Line 13; Delete "btskip_flag" and insert --bt_skip_flag-- therefor